US007279111B2

(12) United States Patent
Conta et al.

(10) Patent No.: US 7,279,111 B2
(45) Date of Patent: Oct. 9, 2007

(54) MONOLITHIC PRINTHEAD WITH BUILT-IN EQUIPOTENTIAL NETWORK AND ASSOCIATED MANUFACTURING METHOD

(75) Inventors: Renato Conta, Ivrea (IT); Mara Piano, Chiaverano (IT)

(73) Assignee: Telecom Italia S.p.A., Milan (IT)

( * ) Notice: Subject to any disclaimer, the term of this patent is extended or adjusted under 35 U.S.C. 154(b) by 61 days.

(21) Appl. No.: 10/845,332

(22) Filed: May 14, 2004

(65) Prior Publication Data

US 2004/0207694 A1 Oct. 21, 2004

Related U.S. Application Data

(62) Division of application No. 10/130,206, filed as application No. PCT/IT00/00463 on Nov. 14, 2000, now Pat. No. 7,070,261.

(30) Foreign Application Priority Data

Nov. 15, 1999 (IT) .............................. T099A0987

(51) Int. Cl.
*G01D 15/00* (2006.01)

(52) U.S. Cl. .......................................... 216/27; 347/54

(58) Field of Classification Search .................. 216/27, 216/79, 67; 347/54
See application file for complete search history.

(56) References Cited

U.S. PATENT DOCUMENTS 4,692,997 A 9/1987 Calviello
5,122,812 A 6/1992 Hess et al.
5,565,084 A 10/1996 Lee et al.
5,600,174 A 2/1997 Reay et al.
5,682,188 A 10/1997 Meyer et al.
5,716,533 A 2/1998 O'Neill et al.
5,877,791 A 3/1999 Lee et al.
6,020,618 A * 2/2000 Sakai ......................... 257/419
6,171,378 B1 * 1/2001 Manginell et al. ............ 96/143
6,206,503 B1 3/2001 Kimura
6,234,608 B1 * 5/2001 Genovese et al. ............ 347/54
6,286,939 B1 9/2001 Hindman et al.
6,412,919 B1 7/2002 Ghozeil et al.
6,420,196 B1 * 7/2002 Silverbrook ................. 438/21
6,790,377 B1 * 9/2004 Cohen ......................... 216/94

OTHER PUBLICATIONS

Lee et al. (A Monolithic Thermal Inkjet Printhead Utilizing Electrochemical Etching and a Two-Step Electroplating Techniques; Proceeding IEEE international Electron Devices, Meeting 1995).*

(Continued)

*Primary Examiner*—Nadine Norton
*Assistant Examiner*—Mahmoud Dahimene
(74) *Attorney, Agent, or Firm*—Venable LLP; Robert Kinberg; Steven J. Schwarz

(57) ABSTRACT

An actuating assembly (50) for ink jet printheads consists of a silicon die (61), which comprises a groove (45) and a lamina (64), and of a structure (75) produced monolithically in the same production process. The actuating assembly (50) comprises a microhydraulics (63), the latter in turn comprising a plurality of channels (67) and chambers (57), made inside the structure (75) by means of a sacrificial metallic layer (54). A conducting layer (26) forms a single interconnected equipotential network used as the electrode during the processes of electrochemical etch stopping on the groove (45), of electrodeposition of the sacrificial layer (54) and of the latter's subsequent removal.

9 Claims, 21 Drawing Sheets

OTHER PUBLICATIONS

R. J. Reay et al., "A Micromachined Low-Power Temperature-Regulated Bandap Voltage Reference", IEEE Journal Of Solid-State Circuits, U.S., IEEE Inc., New York, vol. 30, No. 12, Dec. 1, 1995, pp. 1374-1381, XP000557242.

B. Kloeck et al., "Study Of Electrochemical Etch-Stop For High-Precision Thickness Control Of Silicon Membranes", IEEE Transactions On Electron Devices, U.S., IEEE Inc., New York, vol. 36, No. 4, Apr. 1, 1989, pp. 663-669, XP000039394.

* cited by examiner

Section CC

Fig. 14
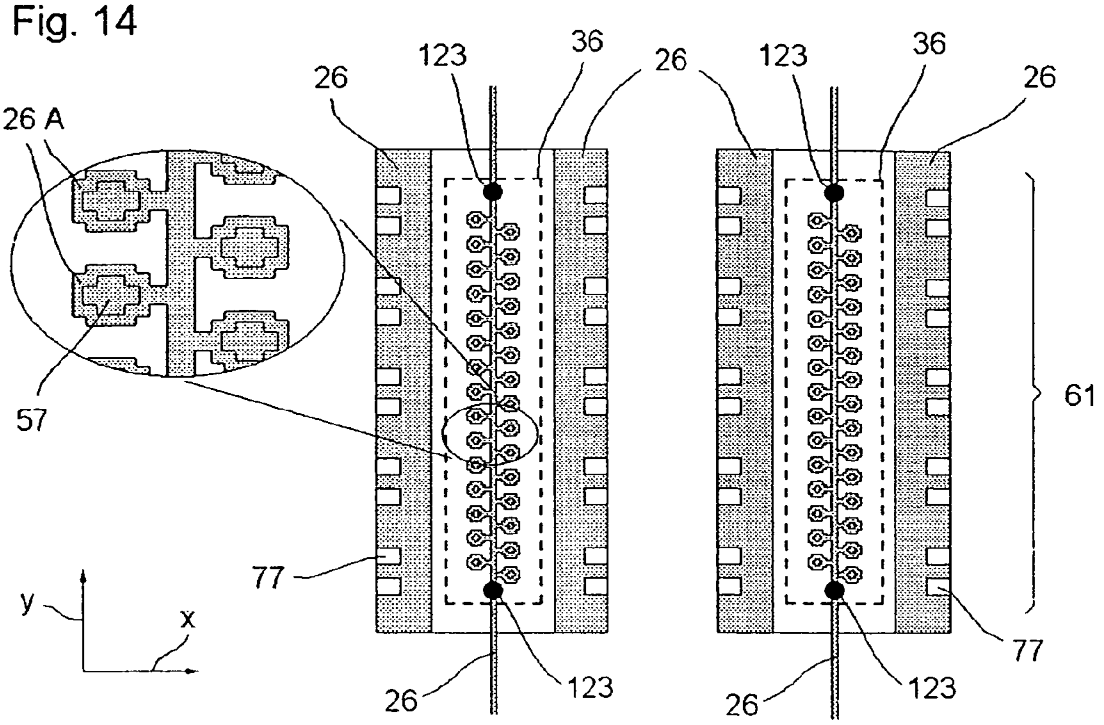
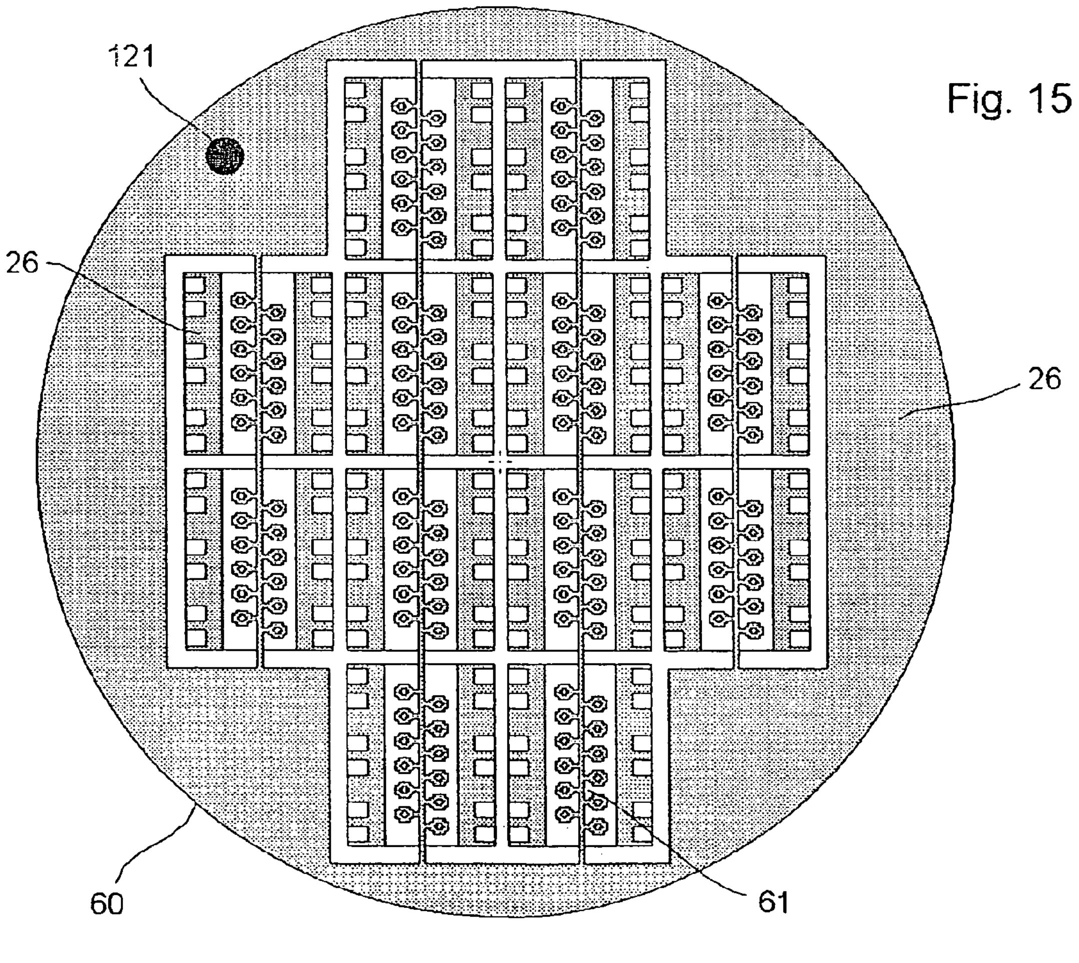
Fig. 15

Fig. 23
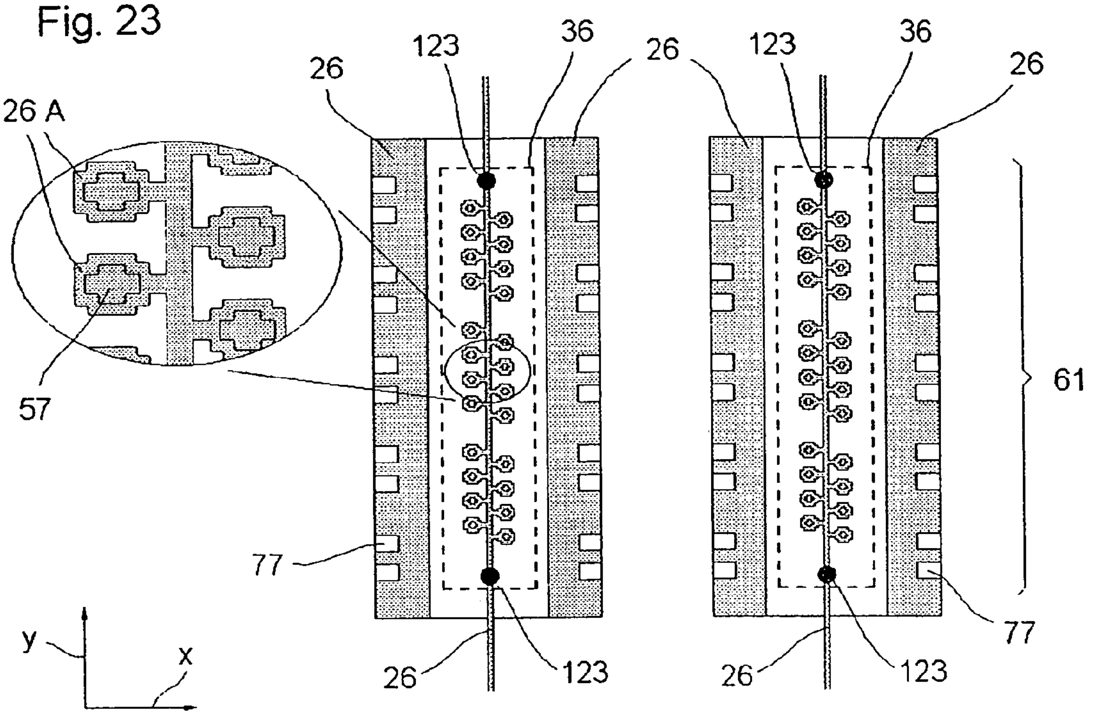
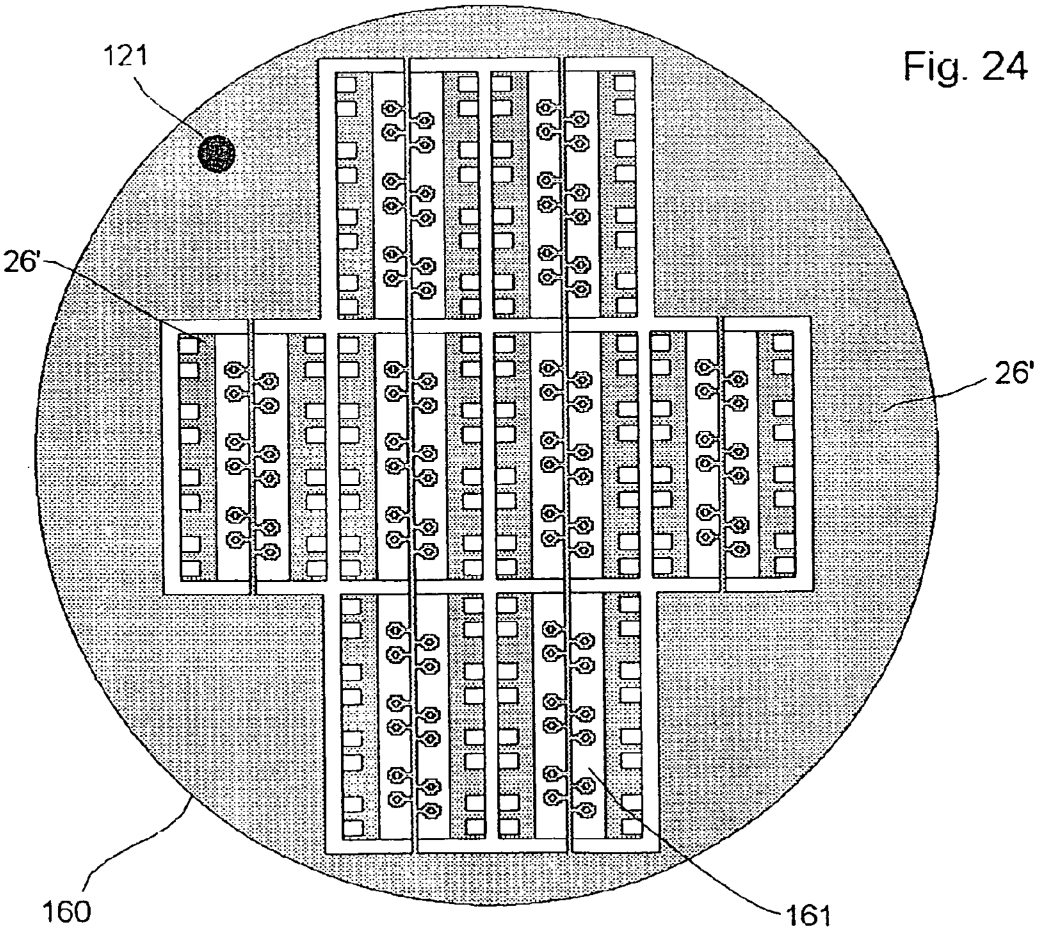
Fig. 24

MONOLITHIC PRINTHEAD WITH BUILT-IN EQUIPOTENTIAL NETWORK AND ASSOCIATED MANUFACTURING METHOD

TECHNICAL FIELD

This invention relates to a printhead used in equipment for forming, through successive scanning operations, black and colour images on a printing medium, normally though not exclusively a sheet of paper, by means of the thermal type ink jet technology, and in particular to the head actuating assembly and the associated manufacturing process.

BACKGROUND ART

Figure 1:
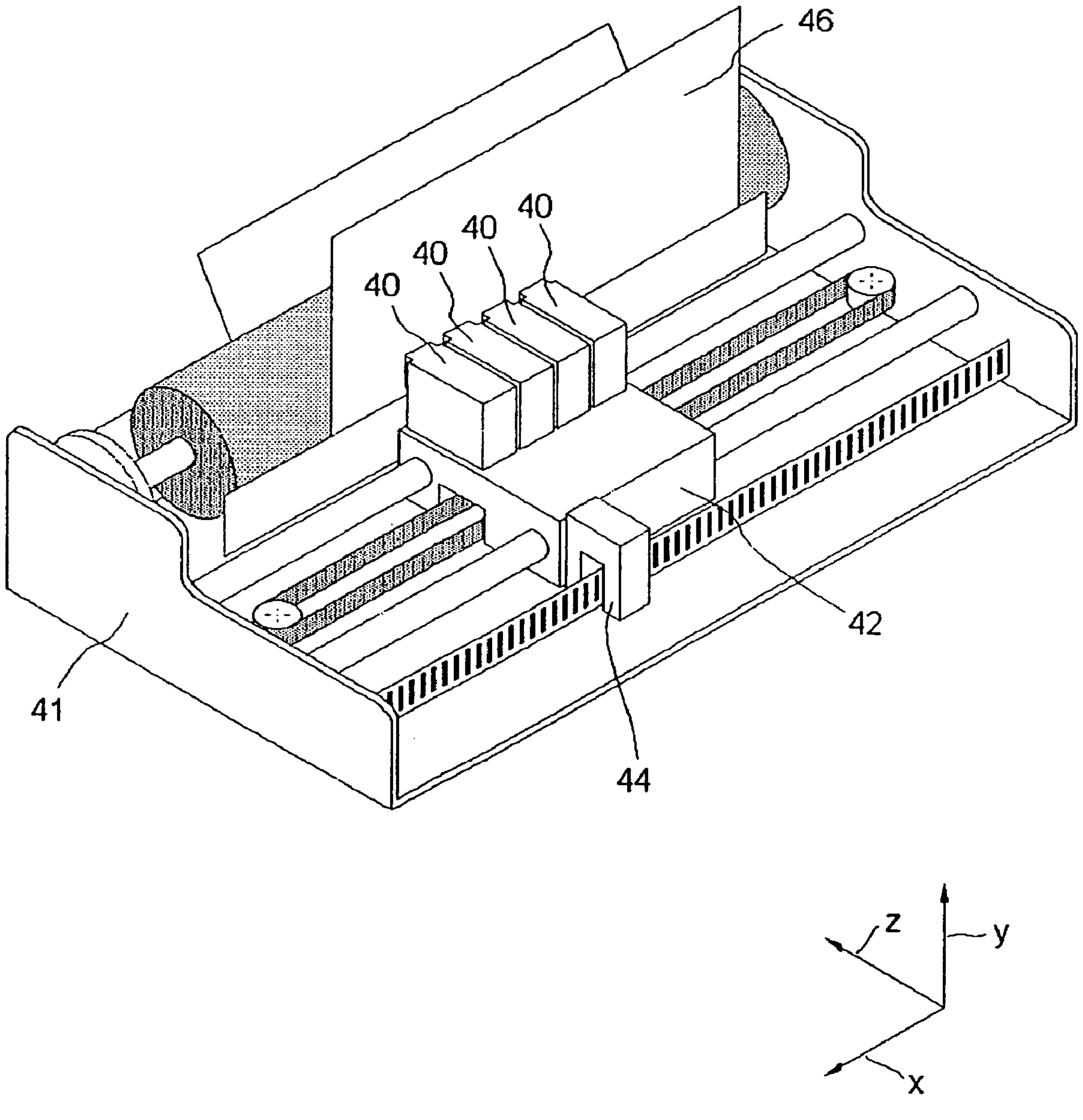

FIG. 1 depicts an ink jet colour printer on which the main parts are labelled as follows: a fixed structure 41, a scanning carriage 42, an encoder 44 and, by way of example, printheads 40 which may be either monochromatic or colour, and variable in number.

The printer may be a stand-alone product, or be part of a photocopier, of a plotter, of a facsimile machine, of a machine for the reproduction of photographs and the like. The printing is effected on a physical medium 46, normally consisting of a sheet of paper, or a sheet of plastic, fabric or similar.

Also shown in FIG. 1 are the axes of reference:

x axis, horizontal, i.e. parallel to the scanning direction of the carriage 42; y axis, vertical, i.e. parallel to the direction of motion of the medium 46; z axis, perpendicular to the x and y axes, i.e. substantially parallel to the direction of emission of the droplets of ink.

The composition and general mode of operation of a printhead according to the thermal type technology, and of the "top-shooter" type in particular, i.e. those that emit the ink droplets in a direction perpendicular to the actuating assembly, are already widely known in the sector art, and will not therefore be discussed in detail herein, this description instead dwelling more fully on some only of the features of the heads and the manufacturing process, of relevance for the purposes of understanding this invention.

The current technological trend in ink jet printheads is to produce a large number of nozzles per head (≧300), a definition of more than 600 dpi (dpi=dots per inch), a high working frequency (≧10 kHz) and smaller droplets (≦10 pl) than those produced in earlier technologies.

Requirements such as these are especially important in colour printhead manufacture and make it necessary to produce actuators and hydraulic circuits of increasingly smaller dimensions, greater levels of precision, narrow assembly tolerances; they also accentuate the problems created by the different thermal expansion coefficients of the various materials of the head.

Great reliability is also required of the heads, especially when making provision for interchangeable ink tanks: the useful life of these heads, known as semi-fixed refill heads, is in fact close to the printer life time.

Thus the need to develop and produce fully integrated monolithic heads, in which the ink channels, the microelectronics of selection, the resistors and the nozzles are integrated in the wafer.

Figure 2:
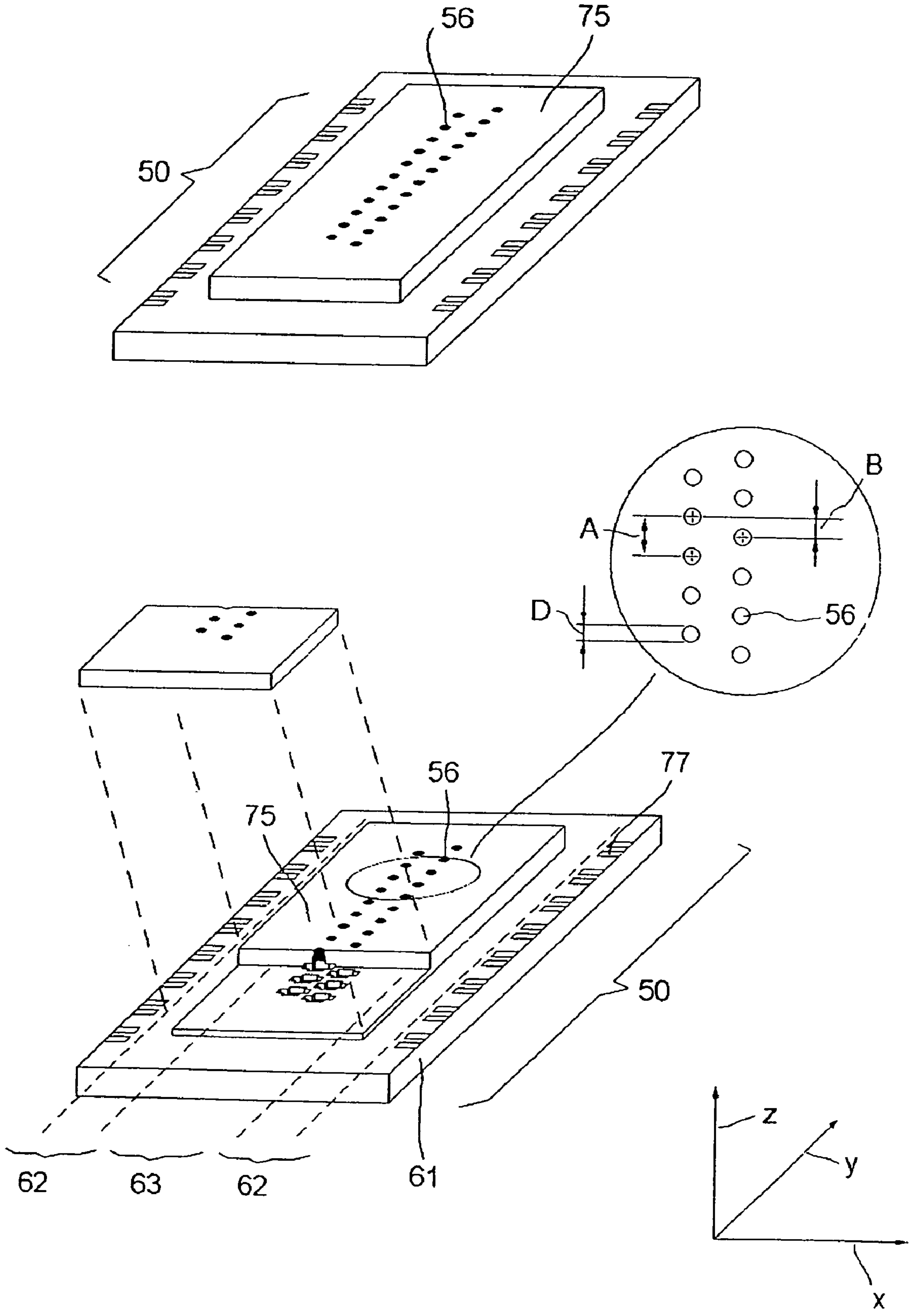

In Italian patent application No. TO 99 A 000610 "Monolithic printhead and associated manufacturing process" a monolithic ink jet printhead is described, that comprises an actuator 50, illustrated in FIG. 2, which in turn consists of a die 61 and a structure 75, the latter containing two rows of nozzles 56. The die 61, of a semiconductor material (usually Silicon), comprises a microelectronics 62 and soldering pads 77, permitting the electrical connection of the microelectronics 62 to the printer control circuits. Microhydraulics 63 belong partly to the structure 75 and partly to the die 61.

In the technology relating to that patent application, the nozzles 56 have a diameter D of between 10 and 60 μm, while their centres are usually spaced apart by a pitch A of 1/300th or 1/600th of an inch (84.6 μm o 42.3 μm). Generally, though not always, the nozzles 56 are arranged in two rows parallel to the y axis, staggered one from the other by a distance B=A/2, in order to double the resolution of the image in the direction parallel to the y axis; the resolution thus becomes close to 1/600th or 1/1200th of an inch (42.3 μm or 21.2 μm). The x, y and z axes, already defined in FIG. 1, are also shown in FIG. 2.

Figure 3:
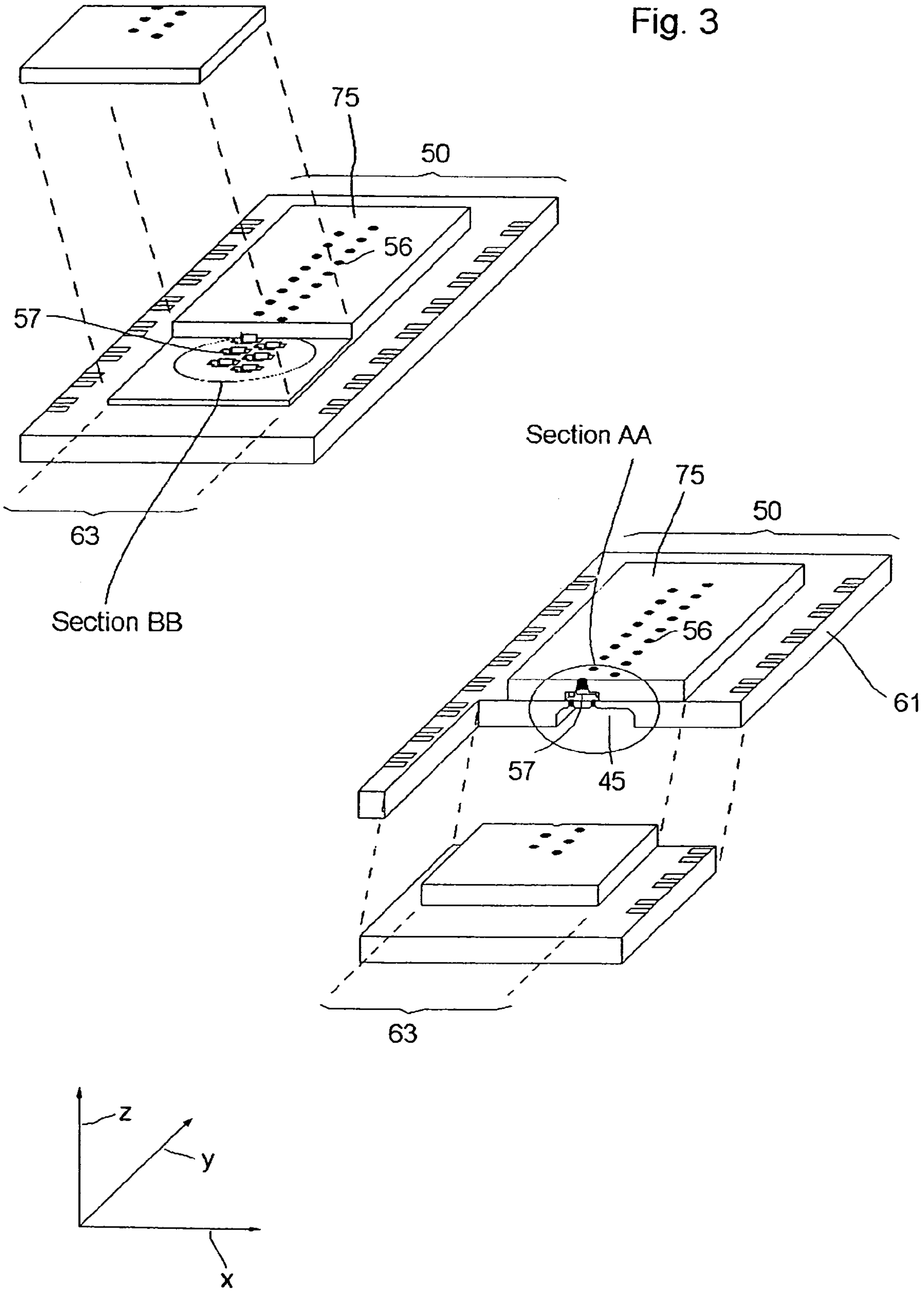

FIG. 3 shows the section AA, parallel to the plane z-x, and the section BB, parallel to the plane x-y, of the same actuating assembly 50, where the following may be seen:

- a plurality of nozzles 56, arranged in two rows parallel to the y axis;
- a plurality of chambers 57, arranged in two rows parallel to the y axis;
- a groove 45, having its greater dimension parallel to the y axis, and accordingly to the rows of the nozzles 56.

Figure 4:
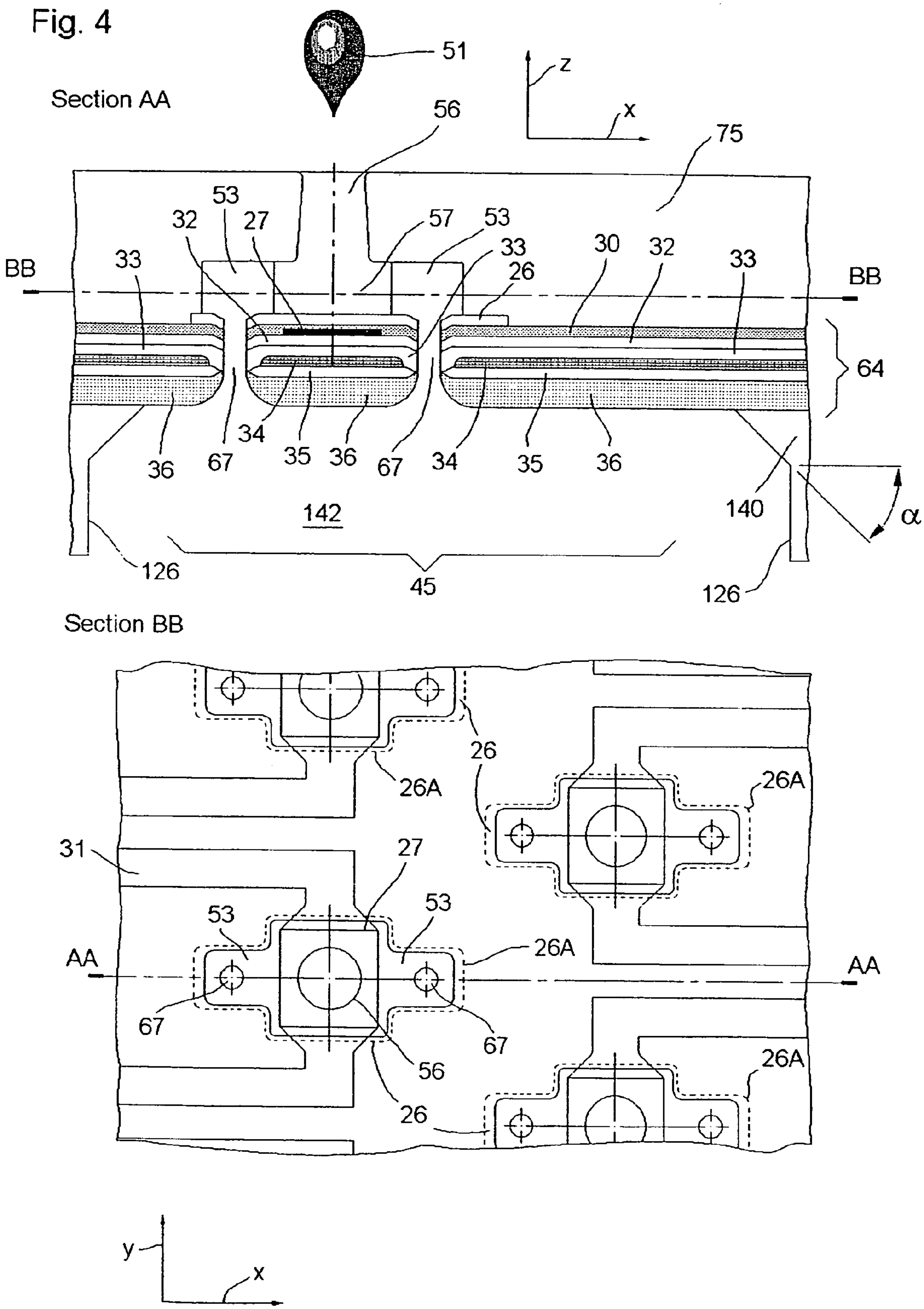

Enlarged views of the same sections are shown in FIG. 4, which includes the following parts:

- the structure 75, made of a layer of, for example, polyamide or epoxy resin, having a thickness preferably between 30 and 50 μm and in turn containing:
- one of the nozzles 56 of said plurality;
- one of the chambers 57 of said plurality;
- ducts 53.

Also shown in this figure are:

- a substrate 140 of Silicon P;
- the groove 45, comprising two parallel walls 126;
- a lamina 64, in turn made of, as a non-restricting example, the following layers:
- a diffused "N-well" layer 36 of Silicon;
- an insulating LOCOS layer 35 of $SiO_2$;
- a resistor 27 of Tantalum/Aluminium having a thickness of between 800 and 1200 Å;
- a layer 34 of polycrystalline Silicon;
- an interlayer 33 of BPSG;
- an interlayer 32, consisting of a layer of $SiO_2$;
- a "second metal" 31;
- a layer 30 of $Si_3N_4$ and of SiC for protection of the resistors; channels 67; and
- a conducting layer 26, consisting of a layer of Tantalum covered by a layer of Gold and divided into segments 26A, indicated by the dashed lines in the figure, which cover entirely the bottom of each chamber 57.

The microhydraulics 63 of an actuator 50 may now be defined as the whole comprising the nozzles 56, chambers 57, ducts 53 and channels 67, and serves the purpose of bringing the ink 142, contained in the groove 45 and in a tank not shown in the figures, to the nozzles 56.

Figure 5:
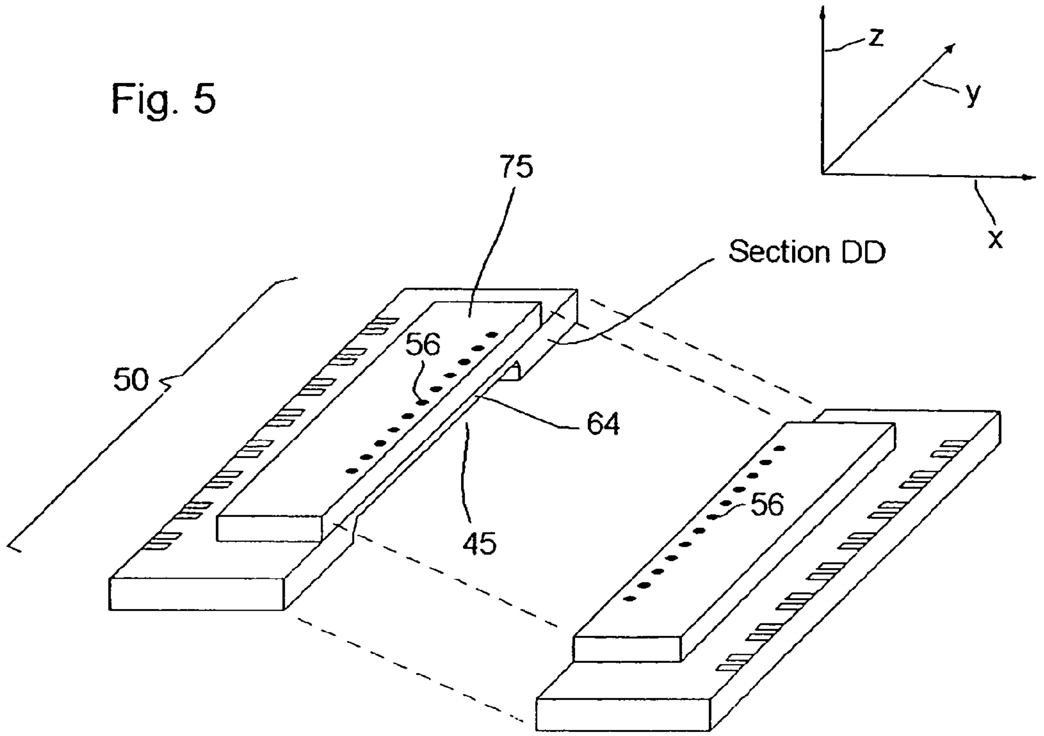
Figure 6:
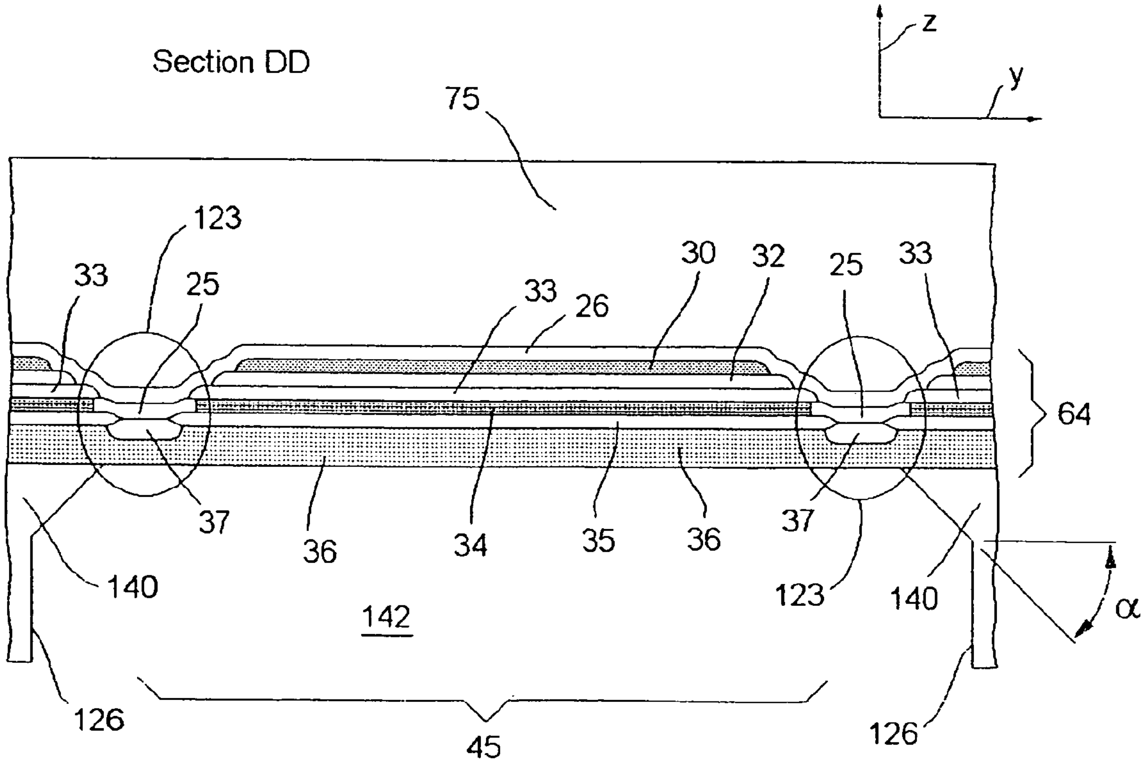

Another actuator 50 is shown in FIG. 5, but this time sectioned parallel to the z plane according to a section DD which is shown enlarged in FIG. 6. The groove 45 and the lamina 64 are seen sectioned according to their longitudinal direction, i.e. parallel to the y axis. Two feedthrough contacts 123 are visible along this section which produce the electric contact between the conducting layer 26 and the N-well layer 36. In correspondence with each feedthrough contact 123, the insulating layers 30, 32 and 33, and the layer 34 of polycrystalline Silicon are taken out, whereas an N+ contact 37 and a "metal" 25 of Aluminium/Copper are grown. The succession of the layers 26, 25, 27 and 36, all strictly in contact with one another and all made of electrically conducting materials, ensures electrical continuity between the conducting layer 26 and the N-well layer 36.

Figure 7:
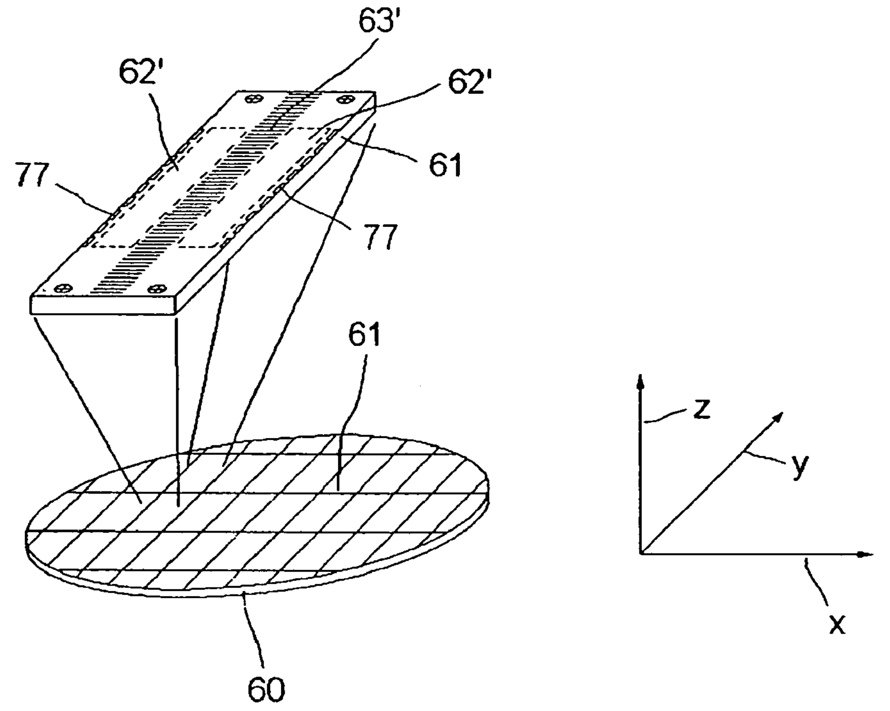

The process of manufacture of the actuator 50 for said monolithic ink jet printhead will now be described in brief. This process initially comprises the production of a "wafer" 60, as indicated in FIG. 7, consisting of a plurality of dice 61, each of which comprises an area 62', suitable for accommodating the microelectronics 62, and an area 63', suitable for accommodating the microhydraulics 63.

In a first part of the process, when all the dice 61 are still joined in the wafer 60, all of the microelectronics 62 are produced and completed and, at the same time, the microhydraulics 63 of each die 61 are partly produced, using the same process steps and the same masks.

Figure 8:
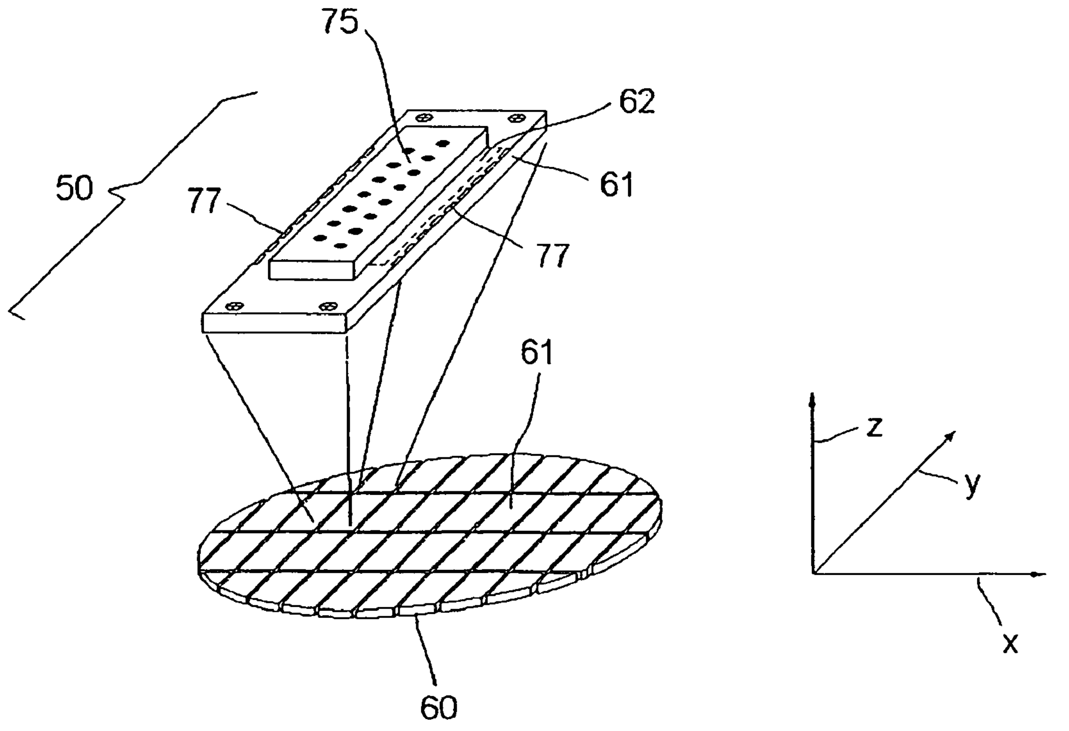

In a second part of the process, on each of the dice 61 still joined in the wafer 60, the structures 75 are made and the microhydraulics 63 are completed by means of operations compatible with the first part of the process. At the end of the process the dice 61 are separated by means of a diamond wheel: the whole consisting of a die 61 and a structure 75 thus constitutes the actuator 50 (FIG. 8).

The first and second part of the monolithic head manufacturing process are described in detail in said Italian patent application No. TO 99 A 000610. The summary description that follows, concerning the second part of the process, contains solely the information needed for an understanding of this invention, and refers to the flow diagram of FIG. 9.

In the step 100, the wafer 60 is available as it stands at the end of the first part of the process, completed in the areas of the microelectronics 62, protected by the protective layer 30 of $Si_3N_4$ and SiC, upon which the conducting layer 26 is deposited, and ready for the subsequent operations in the areas of the microhydraulics 63.

In the step 101, etching commences of the groove 45 by way of the "dry" type technology called ICP ("Inductively Coupled Plasma"), known to those acquainted with the sector art. The part of the groove 45 made in this stage has only the walls 126, substantially parallel to the plane y-z (FIGS. 4 and 6).

In the step 102, etching of the groove 45 is completed by way of a "wet" type technology using, for example, a bath of KOH (Potassium Hydroxide) or TMAH (Tetrametil Ammonium Hydroxide), as is known to those acquainted with the sector art. Etching of the groove 45 progresses according to geometric planes defined by the crystallographic axes of the silicon, and therefore forms an angle $\alpha=54.7°$, as illustrated in FIGS. 4 and 6.

The etching is stopped automatically when the N-well layer 36 is reached by means of a method, called "electrochemical etch stop", known to those acquainted with the sector art.

Following this operation, the groove 45 is delimited by the lamina 64, seen according to section AA in FIG. 4 and section DD in FIG. 6.

In the step 103, by means of the dry etching technology known to those acquainted with the sector art, the channels 67 seen in FIG. 4 are produced, having a diameter preferably between 5 and 20 μm.

In the step 104, electrodeposition of the sacrificial metallic layer 54 is performed.

In the step 105, a structural layer of thickness preferably between 15 and 60 μm and consisting of a negative epoxy or polyamide type photoresist is applied to the upper face of the die 61 which contains the sacrificial layers.

In the step 106, on the structural layer, the nozzles 56 are opened by means of, for instance, laser drilling, and are freed of the photoresist in the areas corresponding to the solder pads 77 and the heads of the dice. In this way, all that remains of the structural layer is the structure 75.

Figure 10:
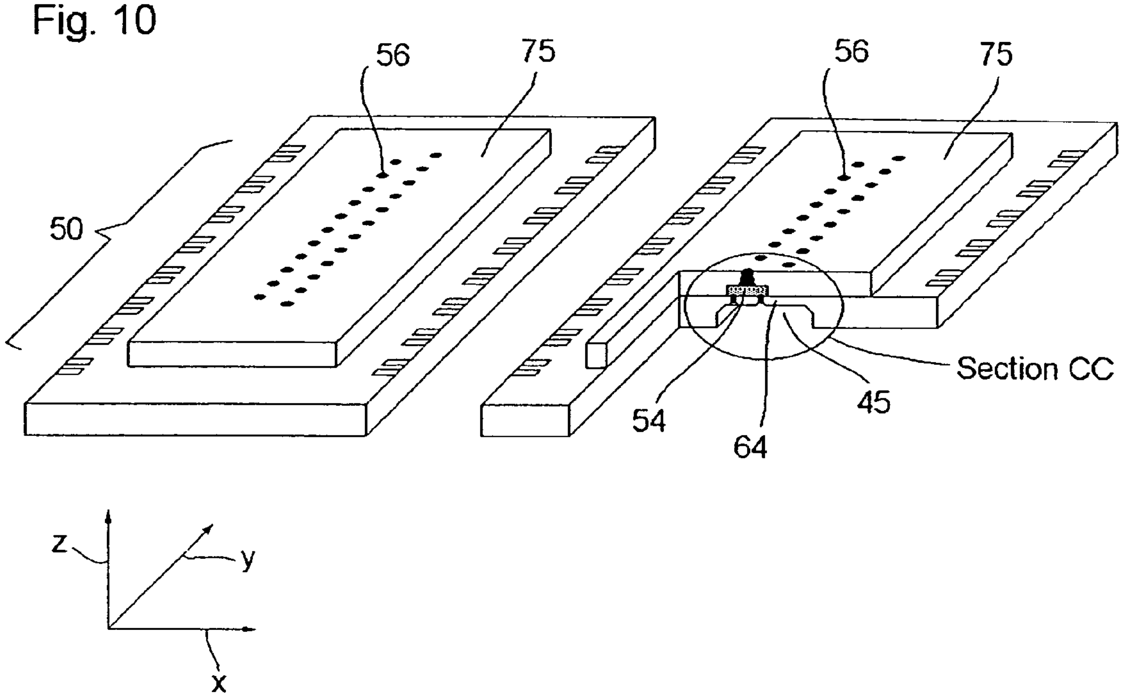
Figure 10:
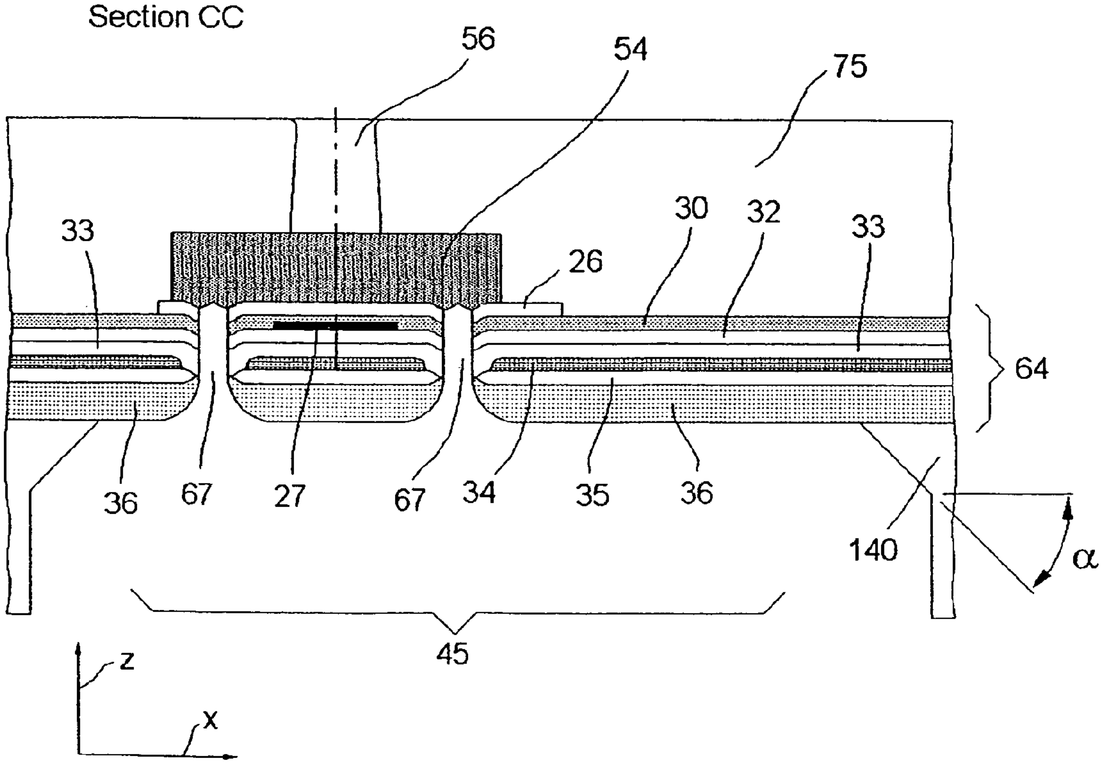

FIG. 10 shows a section CC, parallel to the plane z-x, of the actuator 50 as it appears at this stage of the work.

In the step 107, the structure 75 is hard-baked in order for it to completely polymerize.

In the step 110, the sacrificial layer 54 is removed in an electrolytic process. The cavity left empty by the sacrificial layer 54 accordingly comes to form the ducts 53 and the chamber 57, already illustrated in FIG. 4, the shape of which reflects exactly the sacrificial layer 54.

The technology described from step 104 to step 110 is known to those acquainted with the sector art, and belongs to the technology designated by the abbreviation MEMS/3D (MEMS: Micro Electro Mechanical System).

In the step 111, etching is performed on the protective layer 30 of $Si_3N_4$ and SiC in correspondence with the solder pads 77.

In the step 112, the wafer 60 is cut into the single dice 61 using a diamond wheel, not depicted in any of the figures.

Finally in the step 113, the following operations, known to those acquainted with the sector art, are carried out:

soldering of a flat cable on the die 61 via a Tape Automatic Bonding (TAB) process, for the purpose of forming a subassembly;

mounting of the subassembly on the container of the head 40;

filling of the ink 142;

testing of the finished head 40.

Figure 9:
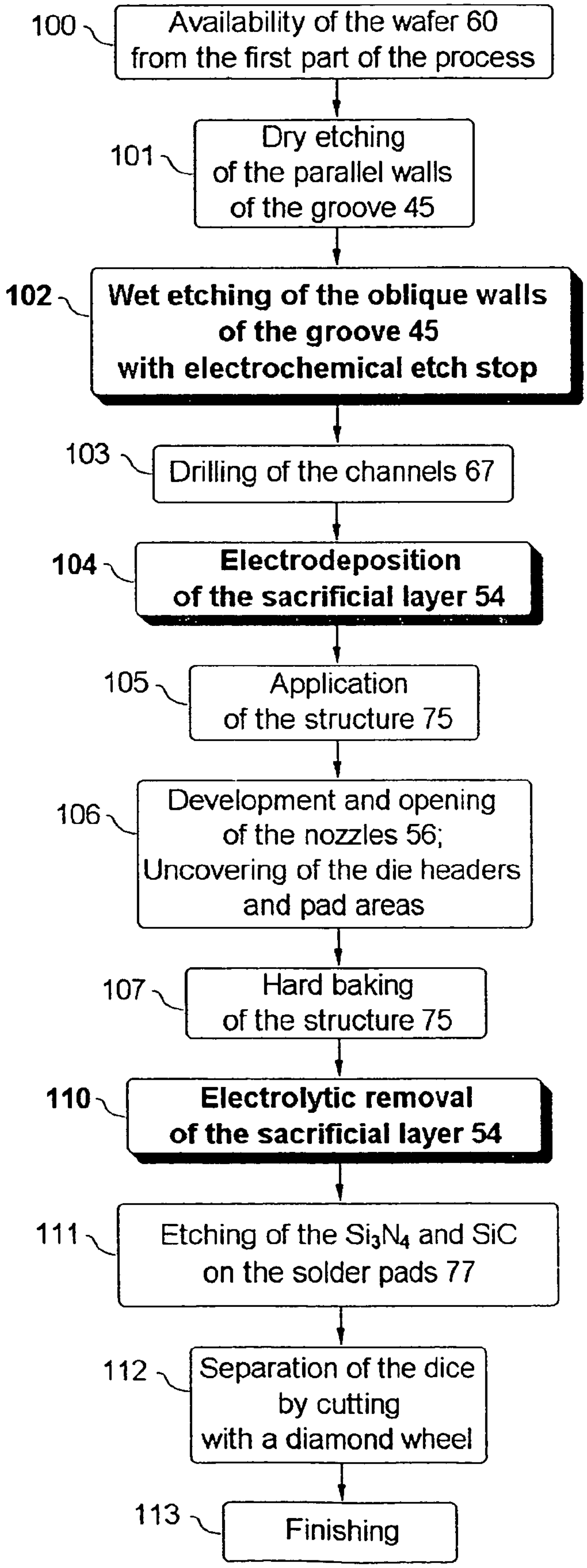

In FIG. 9 the following steps in particular are highlighted by means of bold face characters:

Step 102, wet etching of the oblique walls of the groove 45, with an electrochemical etch stop; step 104, electrodeposition of the sacrificial layer 54; and step 110, electrolytic removal of the sacrificial layer 54.

In correspondence with the steps, operations are carried out in the form of electrochemical processes, during which specific layers belonging to all of the dice 61 of the wafer 60, and where applicable to all the segments into which the dice 61 are divided, must be put at the same electric potential.

Figure 11:
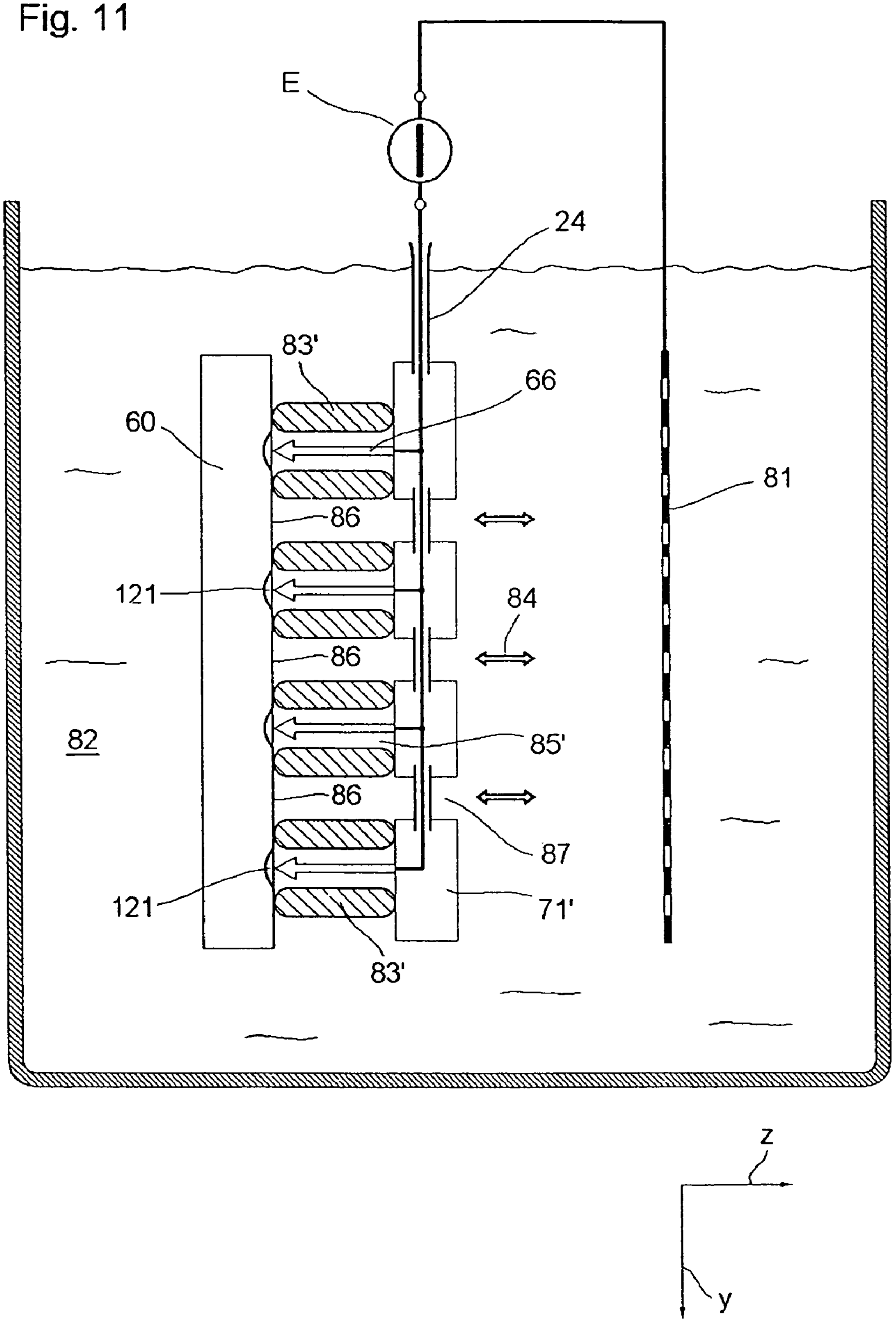

According to the known art, this may be done as illustrated schematically in FIG. 11, in which the following can be seen:

a wafer 60, represented in section, immersed in a generic electrolyte 82;

contact areas 121, belonging to each of said dice 61 and, where applicable, to different segments belonging to each of said dice 61;

a counter-electrode 81;

a fixture 71', containing a plurality of point contacts 66;

a voltage generator E having a first pole connected to said plurality of point contacts 66 and isolated from said electrolyte 82 by way of a sheath 24, and a second pole connected to said counter-electrode 81;

bi-directional arrows 84, indicating the direction of motion of the ions during deposition or removal;

ion depositing or removal zones 86; and ion transit zones 87.

Each point 66 is in electrical contact with one of the contact areas 121, and is contained in a dry volume 85', kept separate from the electrolyte 82 by a seal 83', shown in section view. The contact areas 121 are thus connected to one and the same potential.

Figure 12:
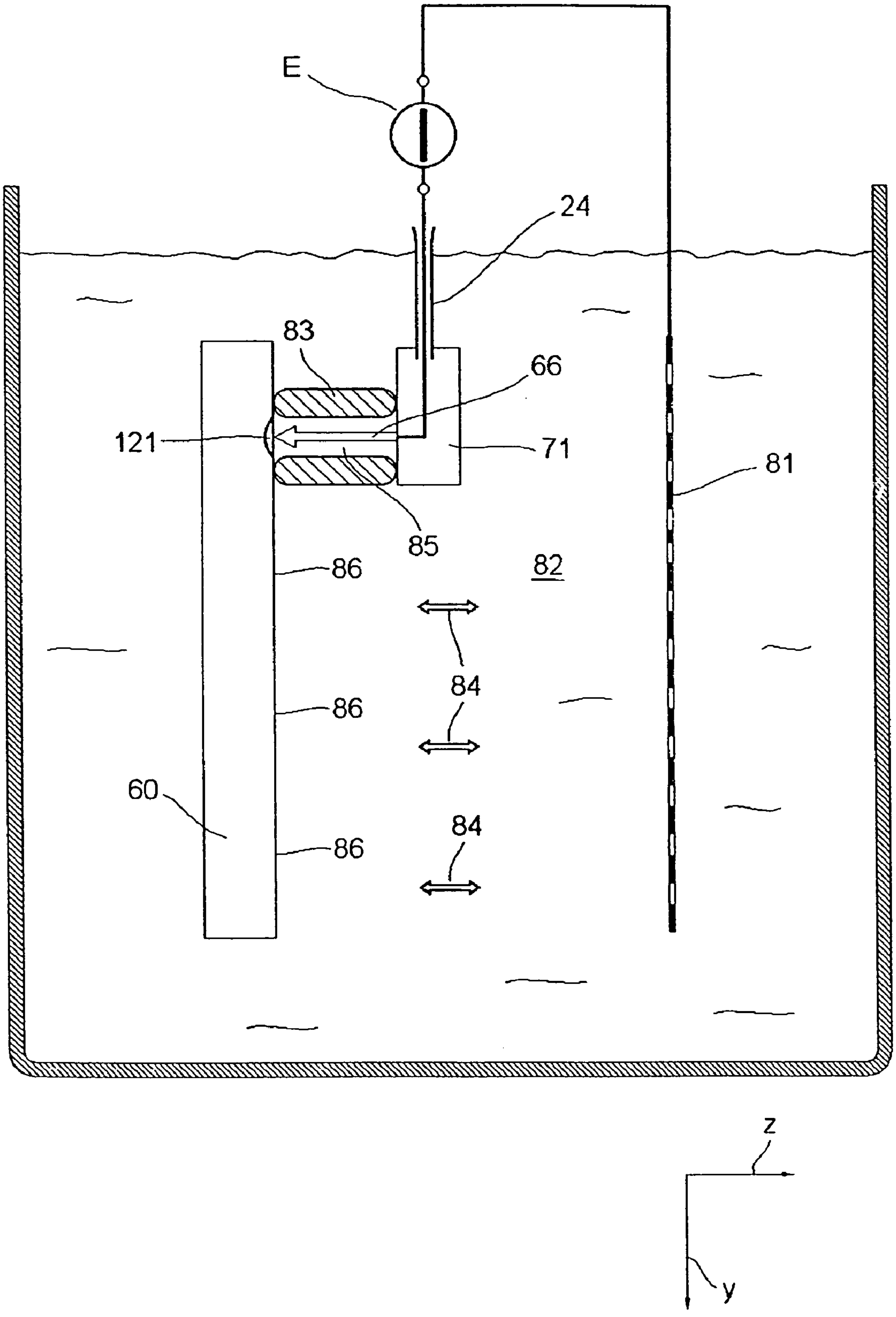

The topology of the various layers and the design of the corresponding masks are highly complex: in this invention, what is proposed is a disposition of the equipotential connections that considerably simplifies topology of the layers and design of the masks, requiring a single contact area 121, a single point contact 66, a single dry volume 85 and a single seal 83, and permitting the use of a simplified fixture 71, as illustrated schematically in FIG. 12.

DISCLOSURE OF THE INVENTION

The purpose of this invention is that of producing equipotential surfaces on the dice 61, needed during each electrochemical process, which permit the use of a single contact area 121, a single point contact 66 and a simplified fixture 71.

A further object is to arrange said contact area 121 on the periphery of the wafer, leaving the entire useful surface of the wafer free.

Another object is to simplify the topology of said equipotential surfaces.

Yet another object is to produce a single equipotential surface through all of the dice 61, suitable for use in the three operations 102, 104 and 110.

Another object is to simplify the design of the masks corresponding to the layers.

A further object is to produce the surface in such a way that it remains substantially equipotential when it is crossed by the currents needed for the electrochemical processes 102, 104 and 110.

Finally yet another object is to connect together, at different points on the same die 61, two or more surfaces belonging to two different layers, in such a way that the current flowing through them during the electrochemical processes finds numerous parallel paths, and therefore less resistance, thereby ensuring a greater equipotentiality between said two or more surfaces.

These and other objects, characteristics and advantages of the invention will be apparent from the description that follows of a preferred embodiment, provided purely by way of an illustrative, non-restrictive example, and with reference to the accompanying drawings.

LIST OF FIGURES

Figure 13:
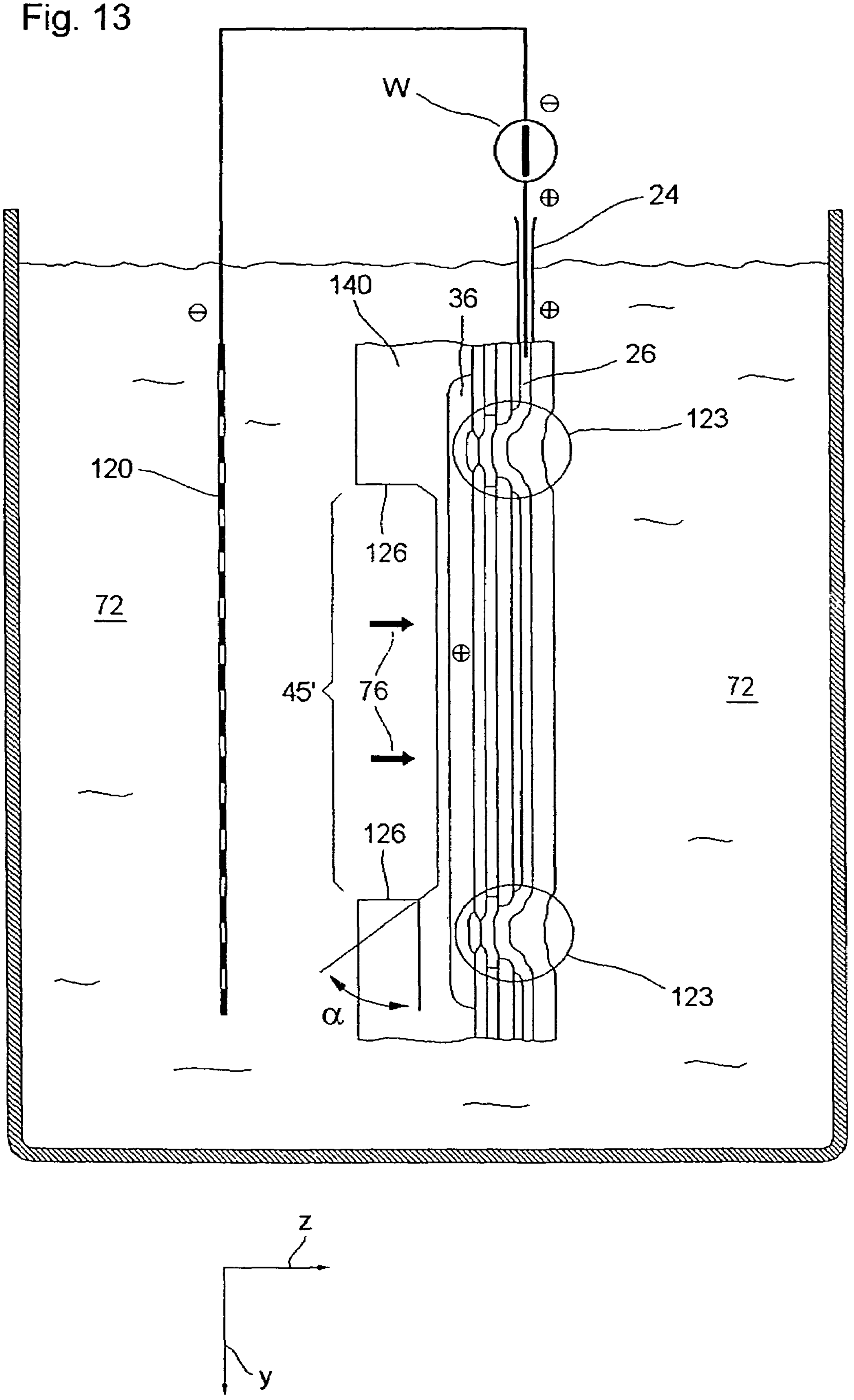
Figure 16:
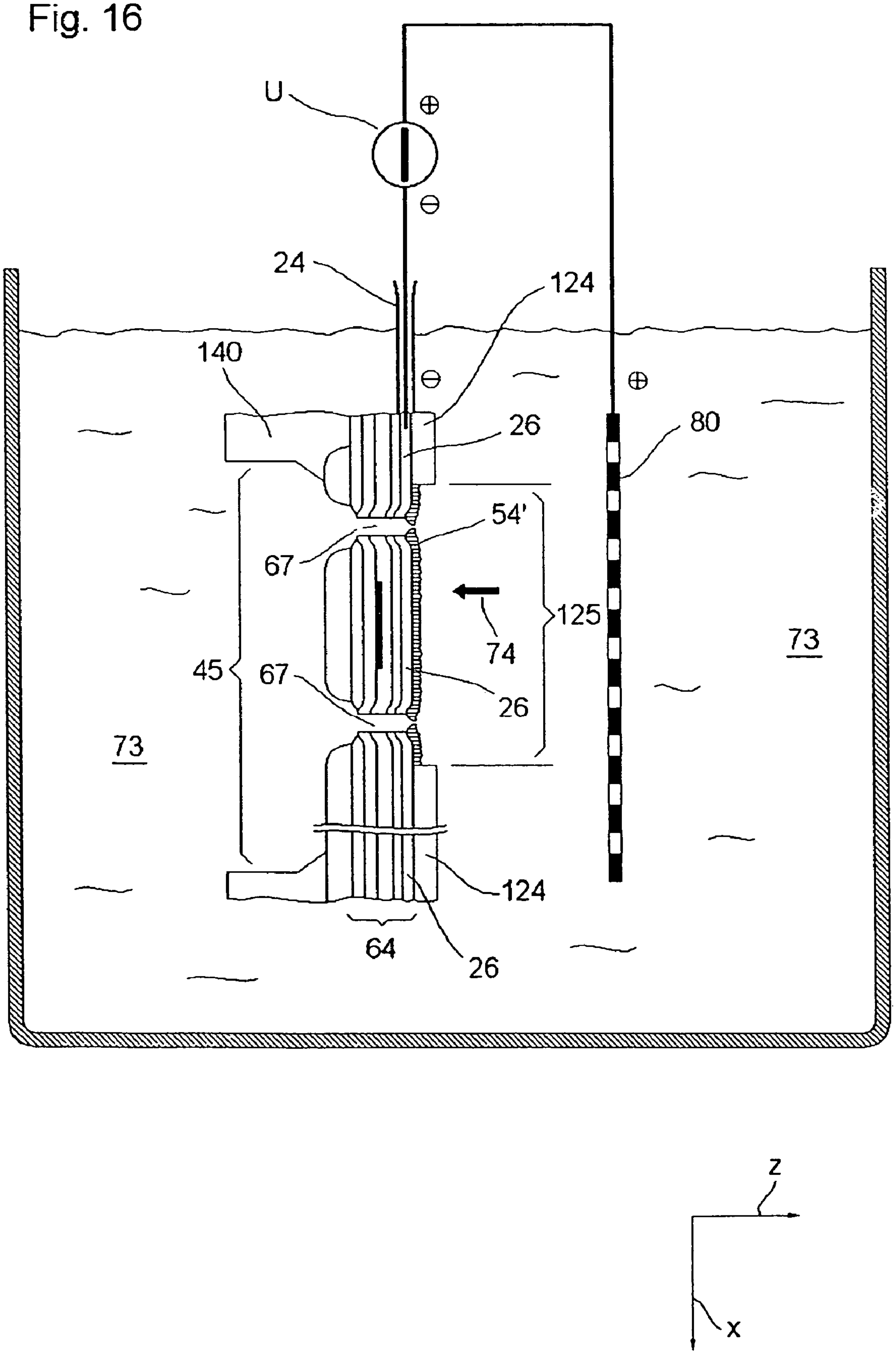
Figure 17:
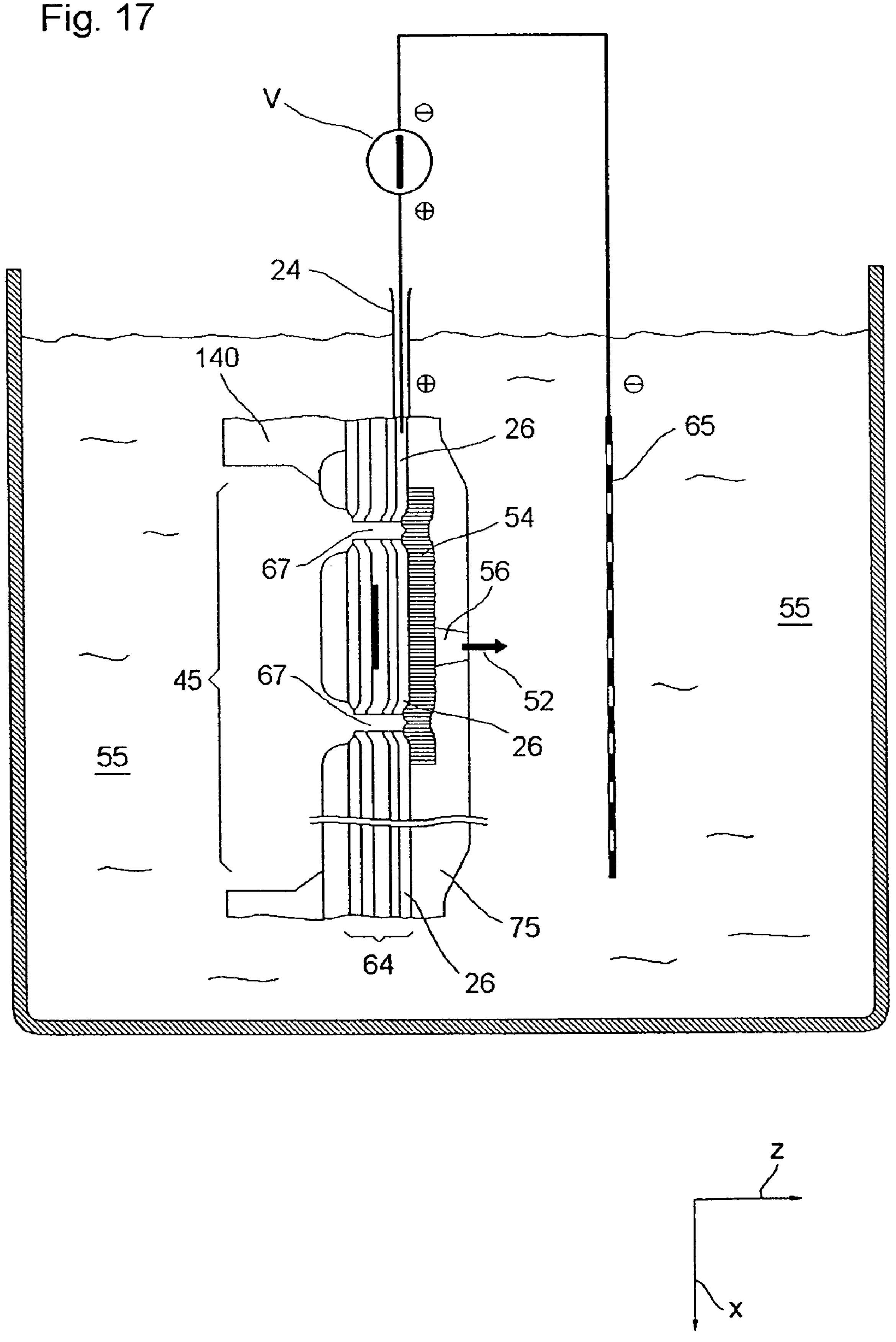
Figure 18:
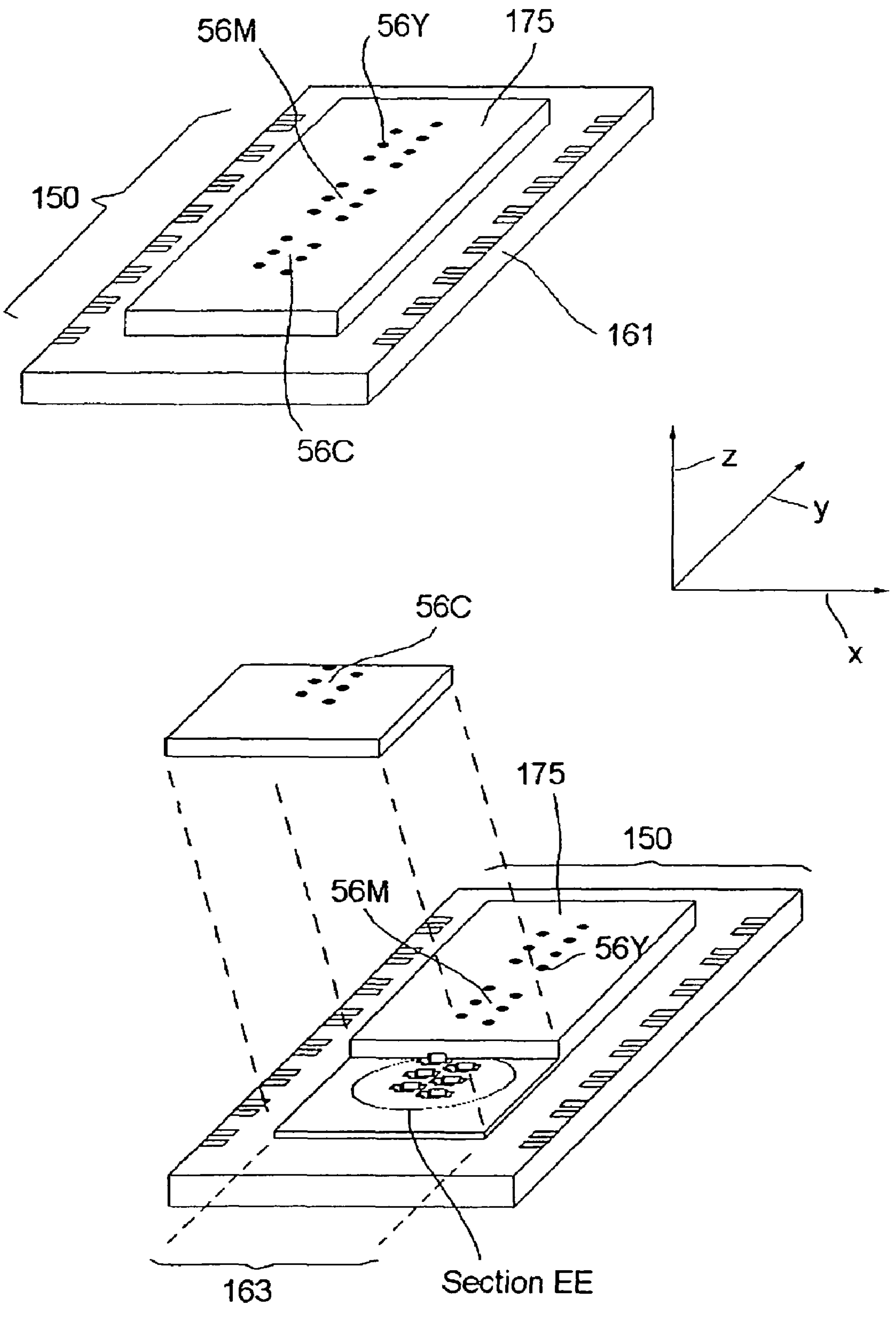
Figure 19:
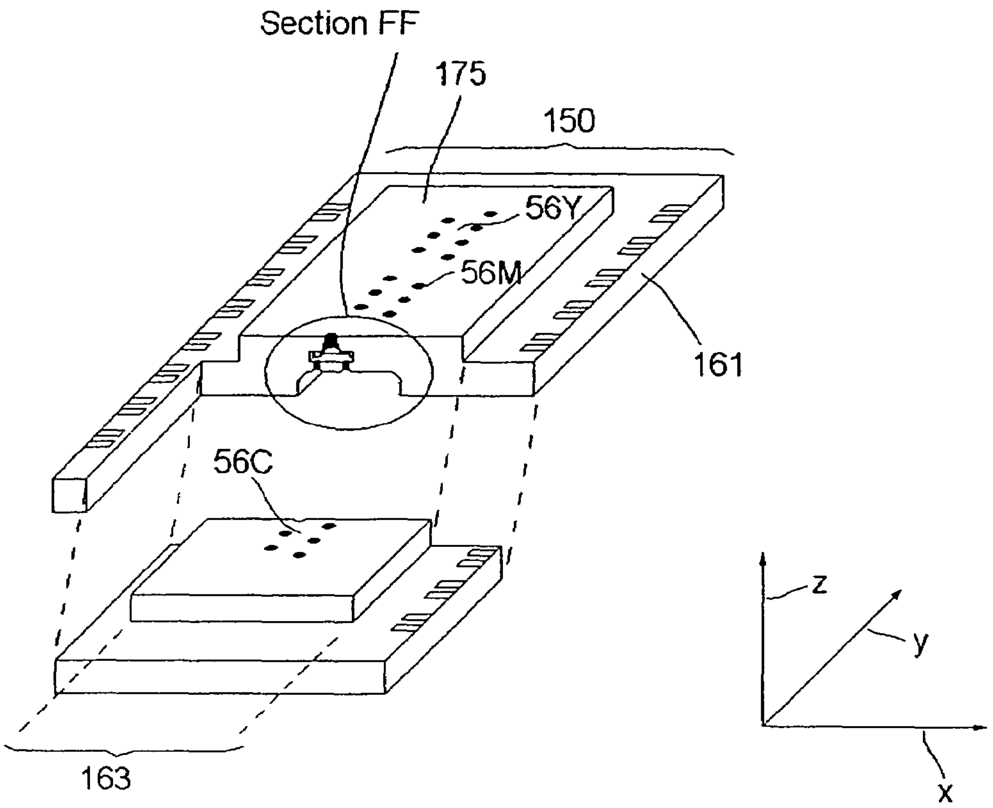
Figure 20:
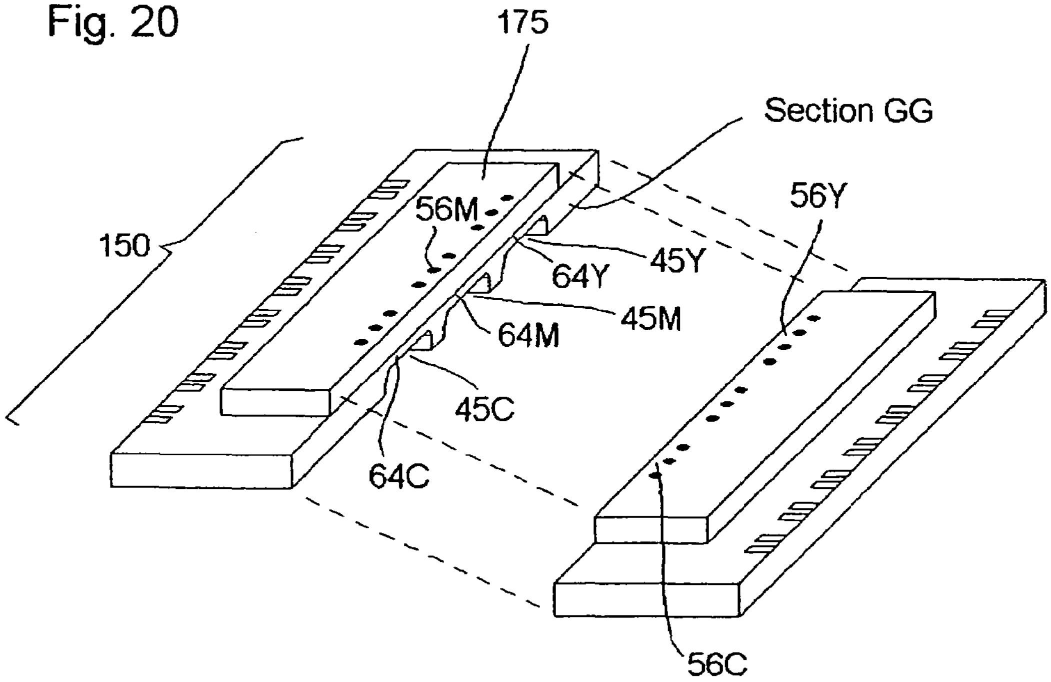
Figure 21:
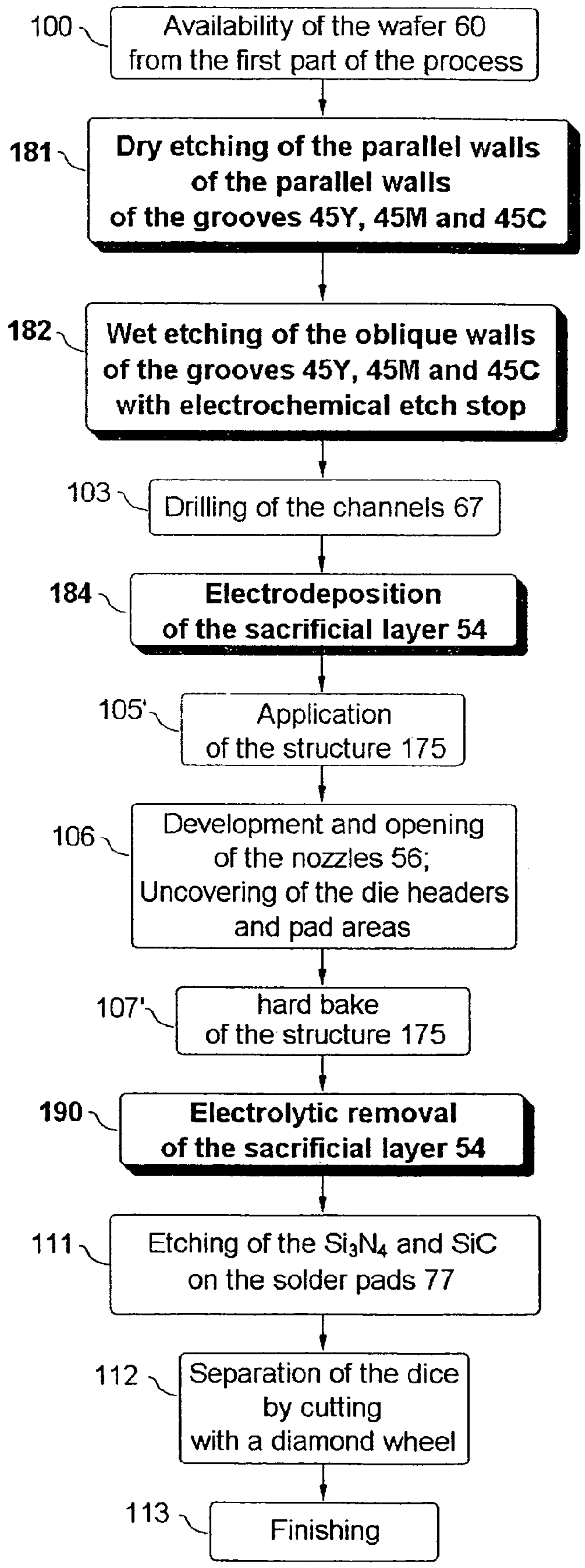
Figure 22:
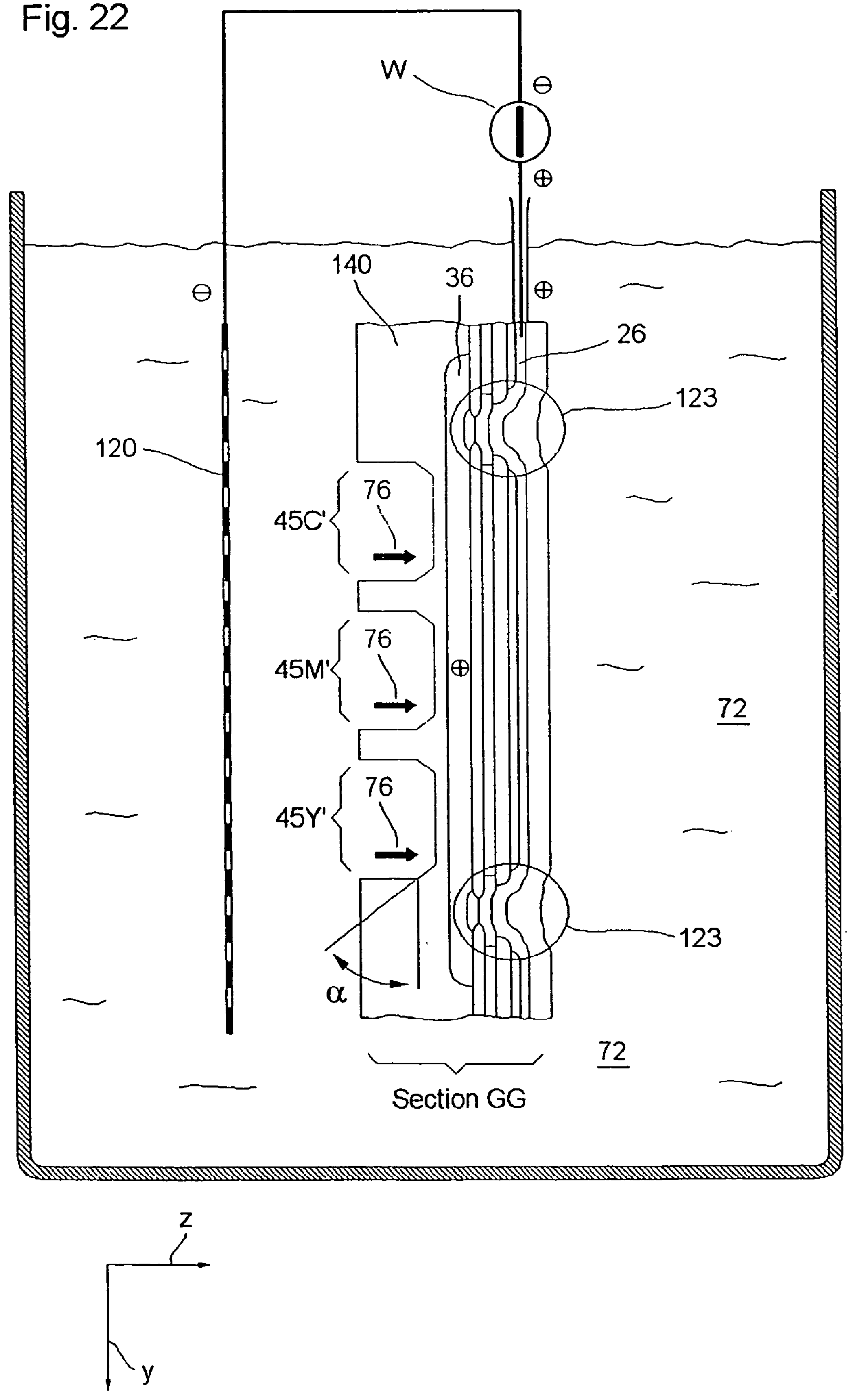
Figure 25:
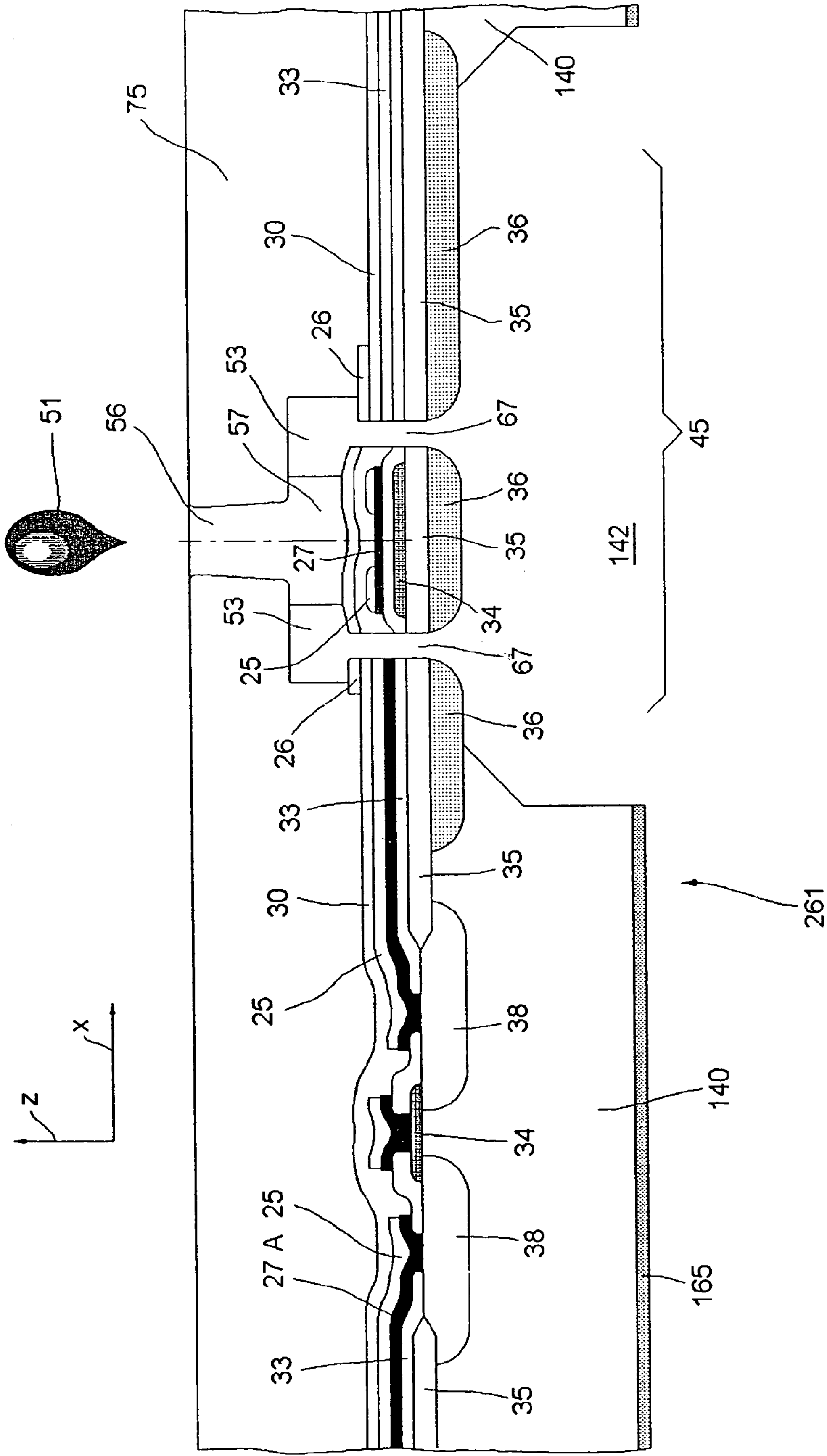
Figure 26:
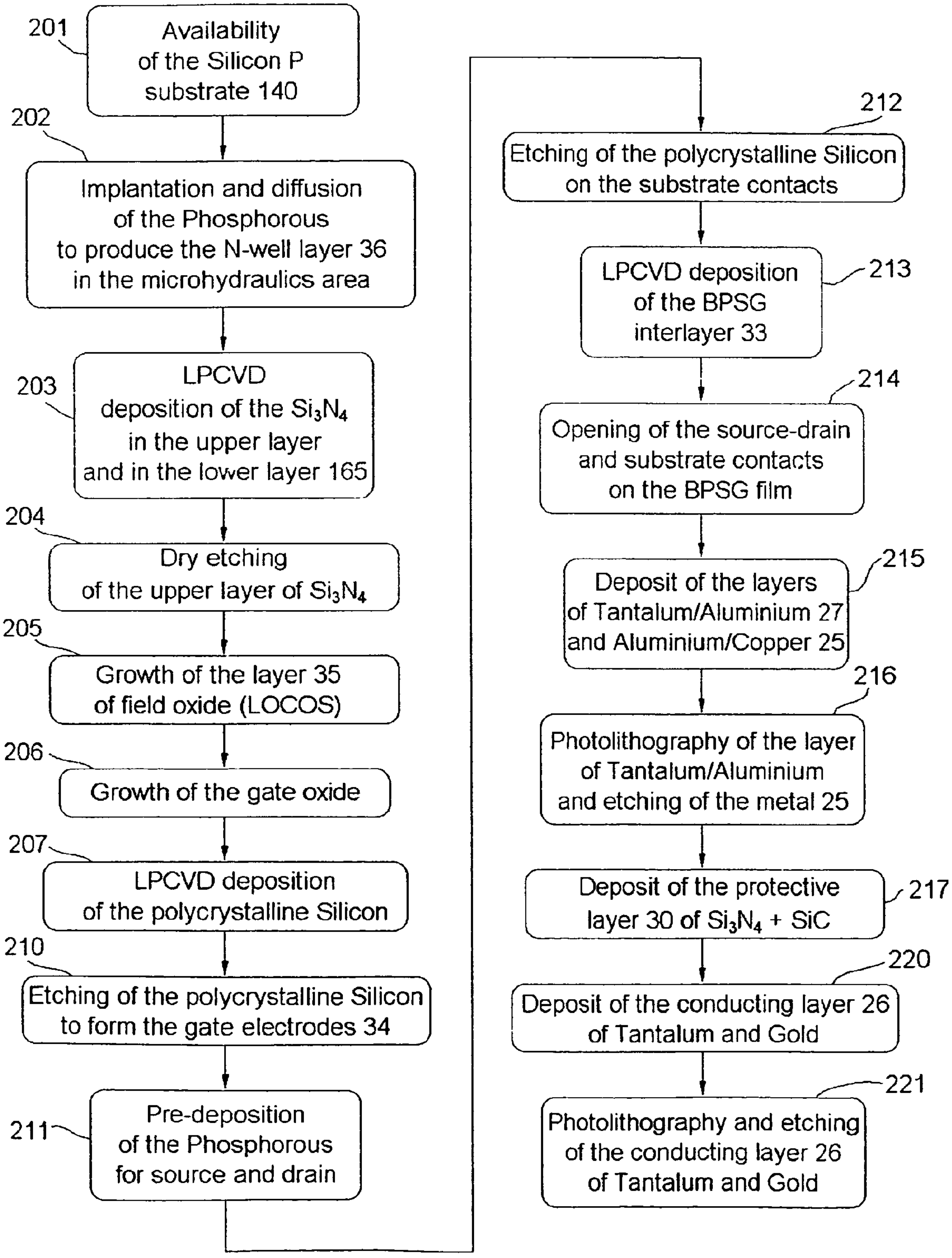

FIG. 1—represents the axonometric projection of an ink jet printer;

FIG. 2—represents an axonometry, with a section and a partial enlargement, of an actuating assembly made according to the Italian patent application No. TO 99 A 000610;

FIG. 3—represents two dice, indicating the sections AA and BB;

FIG. 4—represents the enlargement of the sections AA and BB, indicated in FIG. 3;

FIG. 5—represents a die sectioned longitudinally according to the section DD;

FIG. 6—represents an enlargement of the section DD, indicated in FIG. 5;

FIG. 7—represents a wafer of semiconductor material, containing dice not yet separated;

FIG. 8—represents the wafer of semiconductor material, in which the dice have been separated;

FIG. 9—illustrates the flow of the manufacturing process of the actuating assembly of FIG. 2;

FIG. 10—represents a die sectioned transversally according to the section CC, and the enlargement of the same section in which a sacrificial layer can be seen;

FIG. 11—represents a fixture provided with numerous equipotential point contacts, needed in accordance with the known art;

FIG. 12—represents a simplified fixture, provided with a single equipotential point, according to the invention;

FIG. 13—represents the device for wet etching of the groove;

FIG. 14—represents the topology of the equipotential electrode according to the invention on two adjacent dice;

FIG. 15—represents the topology of the equipotential electrode according to the invention on all the dice of the wafer;

FIG. 16—represents the device for electrodeposition of the sacrificial layer;

FIG. 17—represents the device for removal of the sacrificial layer;

FIG. 18—represents two dice of a colour head, indicating the section EE;

FIG. 19—represents the die of the colour head, sectioned transversally according to the section FF;

FIG. 20—represents the die of the colour head, sectioned longitudinally according to the section GG;

FIG. 21—illustrates the flow of the manufacturing process of the actuating assembly of the colour head of FIG. 19;

FIG. 22—represents the device for wet etching of the groove of the colour head;

FIG. 23—represents the topology of the equipotential electrode of the colour head according to the invention on two adjacent dice;

FIG. 24—represents the topology of the equipotential electrode of the colour head according to the invention on all the dice of the wafer;

FIG. 25—represents a transversal section of a die built using N-MOS technology;

FIG. 26—illustrates the flow of the first part of the manufacturing process of the N-MOS die of FIG. 25.

DESCRIPTION OF THE PREFERRED EMBODIMENT

The manufacturing process of the actuating assembly 50 for the monochromatic or colour ink jet printhead 40 according to this invention comprises a first part, wherein a wafer 60 as indicated in FIG. 8 is made, consisting of the dice 61, on each of which, during the first part, the microelectronics 62 is produced and completed and at the same time, using the same process steps and the same masks, the microhydraulics 63 is partly produced.

In a second part of said process, the microhydraulics 163 is completed.

Said first part of the process is described in detail in the already quoted Italian patent application No. TO 99 A 000610, and is not repeated herein as it is not essential for the understanding of this invention.

The main steps relative to the second part of the process are indicated in the flow diagram of FIG. 9, described earlier. Steps 102, 104 and 110, during which electrochemical processes are carried out, will now be re-examined in greater detail.

FIG. 13 is an illustration of a device for wet etching of the groove 45, with electrochemical etch stop, which is carried out in step 102. The following can be seen in this figure:

- a section according to the plane DD of a die 61 as it appears during the wet etching operation. At this stage of the work, all the dice 61 are joined in the wafer 60, but for clarity's sake the drawing shows only a part of one, single die;

an electrolytic bath 72 for wet etching, consisting for. example of KOH or TMAH;

a D-C voltage generator W; and a counter-electrode 120, made of a conducting material resistant to chemical attack by the electrolytic bath, such as for example Platinum;

Also visible along said section DD are:

the substrate 140 of Silicon P;

the groove 45' made in said substrate 140, which, as it is still incomplete in this stage, is distinguished from the finished groove 45 by means of the numeral with single inverted comma;

the diffused N-well layer 36 of Silicon, which in this operation serves the purpose of stopping the wet etching process ("electrochemical etch stop") when the groove 45 is completed;

the conducting layer 26, which consists of a layer of Tantalum of thickness preferably between 0.4 and 0.6 μm, covered by a layer of Gold of thickness preferably between 100 and 500 Å, and which offers an electrical resistivity in the order of 1 Ω/□ given by the contribution of the layer of Tantalum together with the layer of Gold; and the feedthrough contacts 123 which make the electrical contact between the conducting layer 26 and the N-well layer 36.

The unfinished groove 45' has the two parallel walls 126 made by way of the dry etching process in the previous step 101. In the current step 102, etching of the groove 45' is continued via a "wet" type technology using the electrolytic bath 72. The wet etching of the groove 45' progresses in the direction indicated by the arrows 76 through the substrate 140 according to geometric planes defined by the crystallographic axes of the silicon, and therefore forms an angle $\alpha$=54.7°.

During this operation, the N-well layer 36 is electrically polarized with positive polarity at the voltage W, the value of which depends on the value of the parameters of the electrolyte 72, whereas the counter-electrode 120 is negatively polarized. The surface of separation between the N-well layer 36 and the substrate 140 of silicon P constitutes an inversely polarized junction that stops the passage of current: in this way, the etching proceeds like a normal chemical etching. When the etching reaches the surface of separation, it destroys the junction and allows the passage of a current from the N-well layer 36 to the counter-electrode 120. This current, by electrochemical effect, generates a layer of insulating oxide $SiO_2$, resistant to attack by the electrolyte 72, which halts progress of the etching.

This method of electrochemical etch stop uses a third and sometimes a fourth auxiliary electrode, not shown in the drawings as it is not essential to understanding of the invention, and is known to those acquainted with the sector art having been described, for example, in the article "Study of Electrochemical Etch-Stop for High-Precision Thickness Control of Silicon Membranes" published in the IEEE Transactions on Electron Devices, vol. 36, No. 4, April 1989.

The step 102 continues in time until all the surfaces of the N-well layer 36 present on the wafer 60 have undoubtedly been reached by the etching, in such a way as to correctly complete the groove 45 on all the dice 61.

According to the known art, connection of the positive voltage W to all the segments of all the N-well layers 36 of all the dice 61 is achieved by arranging the contact areas 121 on each of the dice 61 and, where appropriate, on several segments belonging to a single die 61, and putting the areas 121 into contact with the point contacts 66, belonging to the fixture 71', and connected at a single potential, as already illustrated in FIG. 11.

In this invention, production of the equipotential connections is greatly simplified by using as the conductor the conducting layer 26, already necessary in any case as it performs the functions of avoiding cavitation on the resistor 27 following the rapid formation of the vapour bubbles and of equalizing the temperature on the resistor 27. The layer 26 is etched by way of a mask, not shown in any of the figures, and is made according to the geometry indicated by the dotted area in FIG. 14: it still has the functions mentioned above, and also forms an interconnected network which, when connected to the positive electrode of the voltage generator W, constitutes an equipotential surface.

This allows us to make the equipotential surface using the simplified fixture 71, a single point contact 66 and a single contact area 121, without having to add any process steps and using a mask redesigned according to the new geometry without any extra cost.

Also indicated in FIG. 14 with the dashed line is the geometry of the underlying N-well layer 36 and also the feedthrough contacts 123 which electrically connect the N-well layer 36 with two points located at the end of the die of the conducting layer 26. Also indicated are the segments 26A, belonging to the layer 26, each of which covers completely the bottom of a corresponding chamber 57.

Represented in FIG. 15 is the entire wafer 60 having on board all the dice 61. The conducting layer 26, which forms a single equipotential surface through all the dice 61, is indicated by the dotted area in the figure, and contains the contact area 121, located on the periphery of the wafer 60 in order to leave the useful area of the wafer 60 free.

In order to optimize distribution of the current, the contact areas may be more than one.

In the step 104 of the flow chart in FIG. 9, electrodeposition of the sacrificial layer 54 is performed, by means of a device illustrated in FIG. 16. As a non-restricting example, said sacrificial layer 54 is made of Copper. The following may be seen in FIG. 16:

a section according to the plane CC of a die 61 as it appears during the electrodeposition operation. At this stage of the work, all of the dice 61 are still joined in the wafer 60, but for clarity's sake the drawing shows only a part of one, single die;

an electrolytic bath 73 for the electrodeposition, consisting of, for example, Cu Sulfonate Pentahydrate;

a D-C voltage generator U; and an anode 80, consisting of, for instance, electrolytic copper;

The section CC enables us to see:

the substrate 140 of Silicon P;

the diffused N-well layer 36 of Silicon;

the groove 45 completed down until the layer 36 is reached;

the lamina 64;

the channels 67;

the conducting layer 26, consisting of a layer of Tantalum covered by a layer of Gold;

a layer of photoresist 124 having a thickness preferably between 5 and 25 μm;

a window 125, made in the layer of photoresist 124; and the sacrificial layer 54' in growth, which, as it is still incomplete at this stage, is distinguished from the finished sacrificial layer 54 by means of the numeral with single inverted comma.

The Copper is deposited only in correspondence with the window 125 as the latter is in communication with the layer 26, which forms a single conducting and equipotential surface electrically connected to the negative pole of the D-C voltage generator U, the value of which depends on the parameters of the electrolytic bath 73, whereas all the remaining surfaces are covered by the layer 124 of photoresist.

By adopting the geometry already described for the layer 26, an equipotential surface is obtained on all the segments of each die 61 and on all the dice 61 belonging to the wafer 60, using the simplified fixture 71, a single point contact 66 and a single contact area 121 on the surface of the wafer 60, without having to add any steps to the process and at no extra cost.

In a prior chemical activation of the gold surface on the layer 26, it is possible to start a uniform deposition of the Copper over the entire surface of the bottom of the window 52, and simultaneously on all the dice 61 belonging to the wafer 60. The arrows 74 indicate roughly the direction of motion of the ions of Copper.

The composition of the electrolytic bath and the relative additives are selected in such a way as to obtain a horizontal growth factor, i.e. parallel to the x-y plane, substantially equal to the vertical growth factor, i.e. parallel to the z axis, in such a way that, after a vertical growth substantially equal to the thickness of the layer 51 of photoresist, the area above the channels 67 is entirely covered by the Copper. The upper surface of the Copper grown in correspondence with the channels 67 is only partly planarized; the greater the thickness of Copper employed, the better the planarization.

The sacrificial layer 54 may be made using a metal other than Copper, for example Nickel or Gold. In this case, the electrolytic bath could contain, for example, Nickel Sulfonate Tetrahydrate, for depositing the Nickel, or non-Cyanide pure Gold (Neutronex 309), for depositing the Gold.

The electrolytic metal depositing process, such as that described, is preferred to the chemical type depositing processes, commonly called "electroless", as it offers greater deposition speed, greater depositing uniformity, the possibility of producing thicknesses of tens of μm, instead of only a few μm, and is also easier to control.

In the step 110, the sacrificial layer 54 is removed by way of the device illustrated in FIG. 17, where the following are seen:

- a section according to a plane CC of a die 61 as it appears during this removal operation. At this stage of the work, all the dice 61 are still joined in the wafer 60, but for clarity's sake the drawing shows only a part of one, single die;
- an electrolytic bath 55 for the removal, consisting of, for example, a solution of HCl and $HNO_3$ in distilled water in proportions of 1:1.3, with the addition of a surface-active agent, such as for example FC 93 made by 3M;
- a D-C voltage generator V; and
- a counter-electrode 65, made of a conducting material resistant to attack from the electrolytic bath, for instance Platinum;

Also visible along said section CC are:

- the Silicon P substrate 140;
- the lamina 64;
- the groove 45;
- the channels 67;
- the conducting layer 26;
- the structure 75;
- a nozzle 56, maid in the structure 75; and
- the completed sacrificial layer 54, made for instance of Copper.

The structure 75 and the nozzles 56 are now cleaned by way of a plasma etching in a mix of Oxygen and $CF_4$, which burns organic residues and chemically prepares the Copper of the sacrificial layer 54, with the purpose of promoting its removal.

The sacrificial layer 54 is removed in an electrochemical attack performed by way of the electrolyte 55, the renewal of which is promoted by the channels 67 and the nozzles 56, and if necessary by agitation with ultrasounds or a spray jet. The positive pole of the D-C voltage generator V, the value of which depends on the parameters of the electrolytic bath 55, is connected to the conducting layer 26, which forms a single, conducting and equipotential surface, as already described.

The sacrificial layer 54 is in electrical contact with the layer 26: the current flowing between the sacrificial layer 54 and the counter-electrode 65 produces an intense electrolytic corrosion of the Copper constituting the sacrificial layer 54. The arrow 52 indicates roughly the direction of motion of the ions of Copper. Any residues of Copper which, during the electrochemical corrosion remain electrically isolated from the layer 26, are in any case removed chemically through the nozzle 56 and the channels 67 with a supplementary immersion in the bath 55.

By adopting the geometry already described for the layer 26, an equipotential surface is obtained on all the sacrificial layers 54 of each die 61 and on all the dice 61 belonging to the wafer 60, which enables use of the simplified fixture 71, a single point contact 66 and a single contact area 121 on the periphery of the wafer 60, without having to add any steps to the process and at no extra cost.

When the sacrificial layer 54 has been removed entirely, the ducts 53 and the chamber 57 remain, exactly identical in shape to the sacrificial layer 54, as can be seen in FIGS. 2, 3 and 4. During removal of the sacrificial layer 54, the wafer 60 is protected in part by the structure 75, and, where this is missing, by the protective layer 30 of $Si_3N_4$ and of SiC.

SECOND EMBODIMENT

The principle of the invention can also be applied for the production of a head for colour printing, called colour head for short, which uses three or more monochromatic inks to compose a wide range of perceptible colours.

To describe production of the colour head, reference may be made, in a non-restricting way, to the process used for the preferred embodiment of the monochromatic head. FIG. 18 is an axonometric view and a partial section according to a plane EE of an actuating assembly 150 of a colour head which uses, for example and not exclusively, three inks of the basic colours cyan, magenta and yellow. This invention may however also be applied to heads using a different number of coloured inks, as in the non-restrictive list that follows:

- two inks (for example, graphic black and character black);
- four inks (for example, yellow, magenta, cyan and character black);
- five inks (for example, yellow, magenta, cyan, graphic black and character black);
- six inks (for example, three full colours and three pale colours).

The graphic black ink is compatible with the colour inks, and may therefore be overlaid on coloured areas for the purpose, for example, of improving the tones and shading, whereas the character black ink is not compatible with the coloured inks, and must therefore be used on areas without colour for the purpose, for example, of printing a text with greater sharpness than that granted by the graphic black ink.

The actuating assembly 150 comprises:

a colour die 161;

a colour structure 175;

three groups of nozzles 56C, 56M and 56Y, each of which is arranged, in the non-restricting example in the figure, for the emission of droplets of colour ink—cyan, magenta and yellow respectively. The nozzles of each group are arranged in two rows parallel to the y axis; and a colour microhydraulics 163, which belongs partly to the structure 175 and partly to the die 161.

FIG. 19 depicts a transversal section according to a plane FF of the actuating assembly 150 of the colour head, whereas FIG. 20 depicts a longitudinal section according to a plane GG of the same assembly 150. Three grooves 45C, 45M and 45Y are visible in the section GG, delimiting three laminas 64C, 64M and 64 Y, and ducting respectively inks of the three colours cyan, magenta and yellow.

The first part of the process for manufacturing the colour head corresponds to that described in the previously quoted Italian patent application No. TO 99 A 000610, and is not reproduced here. The second part of the process is similar to that described in the preferred embodiment of this invention, and is illustrated in the flow diagram of FIG. 21, similar to the one of FIG. 9. The steps that are identical to those included in FIG. 9 are not described here, whilst those with differences are described, that is to say steps 181, 182, 184 and 190, highlighted in the figure by means of bold face characters.

In the step 181, etching of the grooves 45C, 45M and 45Y commences using the dry ICP technology, known to those acquainted with the sector art. The part of the grooves 45C, 45M and 45Y made in this step has walls 126 substantially parallel to the z axis.

In the step 182, etching of the grooves 45C, 45M and 45Y is completed by means of the wet technology using an electrolytic bath 72, consisting of, for instance, KOH or TMAH, as illustrated in FIG. 22 where the following are shown:

a section according to the plane GG of a die 161 as it appears during this wet etching step. At this stage of the work, all the dice 161 are joined in the wafer 160, but for clarity's sake the drawing shows only a part of one, single die;

the electrolytic bath 72 for the wet etching, consisting for instance of KOH or TMAH;

the D-C voltage generator W; and the counter-electrode 120, made of a conducting material resistant to attack from the electrolytic bath;

The section GG shows:

the Silicon P substrate 140;

the grooves 45'C, 45'M and 45'Y made in said substrate 140, which, as they are still incomplete at this stage, are distinguished from the finished grooves by means of the numeral with the single inverted comma;

the diffused layer 36 of N-well Silicon, which in this operation is used to effect an electrochemical etch stop of the wet etching process upon completion of the grooves 45C, 45M and 45Y;

the conducting layer 26; and the feedthrough contacts 123 which make the electrical contact between the conducting layer 26 and the N-well layer 36.

The wet etching of the grooves 45'C, 45'M and 45'Y progresses along the direction indicated by the arrows 76 through the substrate 140 according to the geometrical planes defined by the crystallographic axes of the Silicon, and therefore forms the angle $\alpha$=54.7°. Said etching is stopped automatically when the N-well: layer 36 is reached by means of the "electrochernical etch stop" method, already described in the account of step 102.

At the end of the step 182, the grooves 45C, 45M and 45Y are delimited by the three laminas 64C, 64M and 64Y, shown in FIG. 20.

The layer 26 is produced according to the geometry indicated by the shaded area in FIG. 23: this forms an interconnected network which, when connected to the positive electrode of the voltage generator W, constitutes an equipotential surface.

Thanks to this, the equipotential surface can be made using the simplified fixture 71, a single point contact 66 and a single contact area 121, without having to add any steps to the process and using a mask redesigned according to the new geometry required by the actuator for a colour head, at no extra cost.

The same FIG. 23 also shows the geometry of the underlying N-well layer 36, in the dashed line, and the feedthrough contacts 123 which electrically connect the N-well layer 36 to two points of the conducting layer 26 located at the end of each die. Also indicated are the segments 26A, belonging to the layer 26, each of which covers entirely the bottom of a corresponding chamber 57.

FIG. 24 depicts the entire wafer 160 with on board all the dice 161. The conducting layer 26, which forms a single equipotential surface through all the dice 61, is indicated as the dotted area in the figure.

In the step 184, electrodeposition is performed of the sacrificial metallic layers 54 in the same way as already described for the step 104, by means of the device already illustrated in FIG. 16. Using the geometry of the layer 26 depicted in FIG. 24, an equipotential surface is obtained on all the segments of each die 161 and on all the dice 161 belonging to the wafer 160, using the simplified fixture 71, a single point contact 66 and a single contact area 121, without having to add any steps to the process and at no extra cost.

In the step 190, the sacrificial layer 54 is removed in accordance with the electrolytic process already described in step 110, which is conducted using the device already illustrated in FIG. 17. The cavity left empty by the sacrificial layer 54 in this way comes to form the ducts 53 and the chamber 57, identical to those of the actuator of the monochromatic head and already illustrated in FIGS. 2, 3 and 4, the shape of which reflects exactly the sacrificial layer 54.

The positive pole of the D-C voltage generator V, the value of which depends on the parameters of the electrolytic bath 55, is connected to the layer 26, which forms a single conducting and equipotential surface to which are connected all the sacrificial layers 54 of each segment on each die 161 and on all the dice 161 belonging to the wafer 160, using the simplified fixture 71, a single point contact 66 and a single contact area 121, without having to add any steps to the process and at no extra cost.

THIRD EMBODIMENT

The principle of the invention can also be applied for the production of an actuator for a monochromatic or colour printhead comprising a die made with N-mos technology, instead of C-mos and LD-mos as described in the preferred embodiment and in the already mentioned Italian patent application No. TO 99 A 000610. FIG. 25 represents schematically a section view of a die 261, made according to the N-mos technology, where the following can be seen:

the Silicon P substrate 140;

the structure 75;

one of the nozzles 56;

one of the chambers 57;

the ducts 53.

the groove 45;

the diffused layer 36 of N-well Silicon, not required for the N-MOS technology, but made specifically to carry out the electrochemical etch stop function;

the LOCOS insulating layer of $SiO_2$;

the Tantalum/Aluminium resistor 27;

a Tantalum/Aluminium layer of adhesion 27A, having a thickness of between 800 and 1200 Å;

the layer 34 di polycrystalline Silicon;

the diffusions 38 of Silicon N+, constituting the source and drain of the N-MOS transistor driving the resistor 27;

the interlayer 33 of BPSG;

the metal 25 of Aluminium/Copper;

the layer 30 of $Si_3N_4$ and SiC for protection of the resistors;

the channels 67; and the conducting layer 26, consisting of a layer of Tantalum covered by a layer of Gold.

Note that, unlike the C-MOS and LD-MOS technology, the N-MOS technology does not require production of the N-well layer 36. However, in this invention, said N-well layer 36 is needed to carry out the electrochemical etch stop function: it can be made specially in the manufacturing process of the die 261 with N-mos technology, as indicated in FIG. 25.

The flow diagram of FIG. 26 shows concisely the steps of the first part of the manufacturing process of the die 261 with N-MOS technology, known to those acquainted with the sector art:

In the step 201, the substrate 140 of silicon P is made available.

In the step 202, the implantation of the phosphorous and its diffusion are carried out to produce the N-well layer 136, solely for the area of the microhydraulics, by means of a first mask not shown in any of the figures as it is not essential for understanding of this invention.

In the step 203, LPCVD deposition of the $Si_3N_4$ is effected in the upper layer and in the lower layer 165 of the wafer.

In the step 204, dry etching is performed of the upper layer of $Si_3N_4$ by means of a second mask not shown in any of the figures.

In the step 205, , the field oxide layer 135 is grown (LOCOS).

In the step 206, the gate oxide is grown.

In the step 207. LPCVD deposition of the gate electrodes 34 of polycrystalline Silicon is performed.

In the step 210, the polycrystalline Silicon is etched by means of a third mask, to form the gate electrodes 34.

In the step 211, pre-deposition is effected of the Phosphorous for source and drain.

In the step 212, the polycrystalline Silicon is etched on the substrate contacts by means of a fourth mask.

In the step 213, LPCVD deposition of the interlayer 33 of BPSG is performed.

In the step 214, the source-drain and substrate contacts on the BPSG film are opened by means of a fifth mask.

In the step 215, the layer 27A of Tantalum/Aluminium, containing the resistors 27, and the metal 25 of Aluminium/Copper forming the conductors are deposited.

In the step 216, photolithography is performed of the layer of Tantalum/Aluminium and the metal 25 etched by means of a sixth mask.

In the step 217, the protective layer 30 of $Si_3N_4$+SiC is deposited.

In the step 220, the conducting layer 26 of Tantalum and Gold is deposited.

In the step 221, photolithography and etching of the conducting layer 26 of Tantalum and Gold are performed by means of a seventh mask.

The second part of the manufacturing process of the die 261 according to the N-MOS technology is identical to the second part of the manufacturing process of the die 61 produced according to the C-MoS and LD-Mos technology, and has already been described in relation to the preferred embodiment.

In short, without prejudice to the principle of this invention, the construction details and the embodiments may be abundantly varied with respect to what has been described and illustrated, without departing from the scope of the invention.

The invention claimed is:

1. Method for the manufacture of a monolithic actuating assembly for an ink jet printhead, said monolithic actuating assembly being provided with a die, comprising the steps of:

disposing of a wafer comprising a plurality of said dice of semiconductor material, at least one dice comprising a substrate of Silicon P and each dice comprising a plurality of layers;

etching, in said substrate of each of said dice, a first part of a groove;

etching a second part of said groove, in such a way that a lamina made of said plurality of layers is made in each of said dice;

performing a deposition of a plurality of sacrificial layers on each of said laminas;

applying a structural layer on each of said laminas, in such a way that said structural layer covers said plurality of sacrificial layers;

performing a removal of said plurality of sacrificial layers, in such a way that a plurality of chambers and a plurality of ducts are obtained;

wherein said steps of etching a second part of said groove, performing a deposition of a plurality of sacrificial layers on each of said dice and performing a removal of said plurality of sacrificial layers on each of said dice are carried out by way of electrochemical processes using as the electrode a conducting layer, made of an electrically conductive material, which forms a single equipotential network connected on the inside of each of said dice.

2. Method according to claim 1, wherein said conducting layer forms a single network connected between at least two different said dice.

3. Method according to claim 1, wherein said step of etching, in said substrate of each of said dice, a first part of a groove is carried out through a dry process.

4. Method according to claim 1, wherein said steps of etching a first part of said groove and etching a second part of said groove, further comprises the steps of etching a first part of three grooves, or of a different number of grooves, through a dry process and etching a second part of said three grooves, or of a different number of grooves, through a wet process.

5. Method according to claim 1, wherein said die is made by C-MOS and LD-MOS technology or by N-MOS technology.

6. Method according to claim 1, wherein said conducting layer assumes an electric working potential by way of at least one point contact.

7. Method according to claim 4, wherein said at least one point contact is in contact with said conducting layer at a point located on the periphery of said wafer.

8. A method for the manufacture of a monolithic actuating assembly for an ink jet printhead, said monolithic actuating assembly being provided with a die comprising a substrate of silicon P and a plurality of layers, comprising:

a step of depositing a plurality of sacrificial layers on said plurality of layers, wherein said step of deposing a plurality of sacrificial layers is carried out by way of electrochemical processes using as an electrode, a conducting layer made of an electrically conductive material, which forms a single equipotential network connected on the inside of each of said die.

9. A method for the manufacture of a monolithic actuating assembly for an ink jet printhead, said monolithic actuating assembly being provided with a die comprising a substrate of silicon P and a plurality of layers, comprising:

a step of removing a plurality of sacrificial layers made on said plurality of layers, wherein said step of removing a plurality of sacrificial layers is carried out by way of an electrochemical processes using as an electrode, a conducting layer made of an electrically conductive material, which forms a single equipotential network connected on the inside of said die.

* * * * *